(12) United States Patent
Yokokawa et al.

(10) Patent No.: US 7,898,632 B2
(45) Date of Patent: Mar. 1, 2011

(54) ELECTRO-OPTICAL DEVICE, MANUFACTURING METHOD THEREOF, AND ELECTRONIC APPARATUS

(75) Inventors: Magoyuki Yokokawa, Matsumoto (JP); Teiichiro Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1107 days.

(21) Appl. No.: 11/640,680

(22) Filed: Dec. 18, 2006

(65) Prior Publication Data

US 2007/0146598 A1 Jun. 28, 2007

(30) Foreign Application Priority Data

Dec. 28, 2005 (JP) ............................. 2005-377155
Feb. 10, 2006 (JP) ............................. 2006-033343

(51) Int. Cl.
*G02F 1/1339* (2006.01)
*G02F 1/1345* (2006.01)

(52) U.S. Cl. ........................ 349/153; 349/152
(58) Field of Classification Search .................. 349/153
See application file for complete search history.

(56) References Cited

U.S. PATENT DOCUMENTS

| | | | |
|---|---|---|---|
| 5,936,694 A | 8/1999 | Suzuki et al. | |
| 6,055,034 A | 4/2000 | Zhang et al. | |
| 6,124,917 A | 9/2000 | Fujioka et al. | |
| 6,249,333 B1 | 6/2001 | Zhang et al. | |
| 6,400,439 B1 | 6/2002 | Fujioka et al. | |
| 6,850,308 B2 | 2/2005 | Fujioka et al. | |
| 6,943,863 B2 | 9/2005 | Fujioka et al. | |
| 7,142,273 B1 | 11/2006 | Zhang et al. | |
| 7,298,447 B1 | 11/2007 | Zhang et al. | |
| 2004/0263740 A1* | 12/2004 | Sakakura et al. | 349/138 |
| 2005/0253984 A1* | 11/2005 | Kim et al. | 349/106 |
| 2007/0146625 A1 | 6/2007 | Ooi et al. | |
| 2008/0020518 A1 | 1/2008 | Zhang et al. | |

FOREIGN PATENT DOCUMENTS

| | | |
|---|---|---|
| JP | 06-095128 A | 4/1994 |
| JP | 06-148678 A | 5/1994 |
| JP | 06-186588 A | 7/1994 |
| JP | 9-222612 A | 8/1997 |
| JP | 10-010578 A | 1/1998 |
| JP | 11-167125 A | 6/1999 |
| JP | 2001-133768 A | 5/2001 |
| JP | 2001-142057 A | 5/2001 |
| JP | 2001-183696 A | 7/2001 |
| JP | 2004-029526 A | 1/2004 |
| JP | 2005-140836 A | 6/2005 |
| WO | WO-2005-106571 | 11/2005 |

* cited by examiner

*Primary Examiner*—Wen-Ying P Chen
(74) *Attorney, Agent, or Firm*—AdvantEdge Law Group, LLC

(57) ABSTRACT

An electro-optical device including a first substrate, a second substrate facing the first substrate, with a sealing material interposed between the first and second substrates, liquid crystals being interposed in at least an effective pixel region between the first and second substrates, comprises an alignment layer that is formed on at least one of the first and second substrates immediately below the sealing material and aligns the liquid crystals, and a lower layer formed below the alignment layer, wherein a transparent conductive layer that is firmly adhered to the alignment layer and the lower layer is formed in a region covering at least the sealing material between the alignment layer and the lower layer.

16 Claims, 23 Drawing Sheets

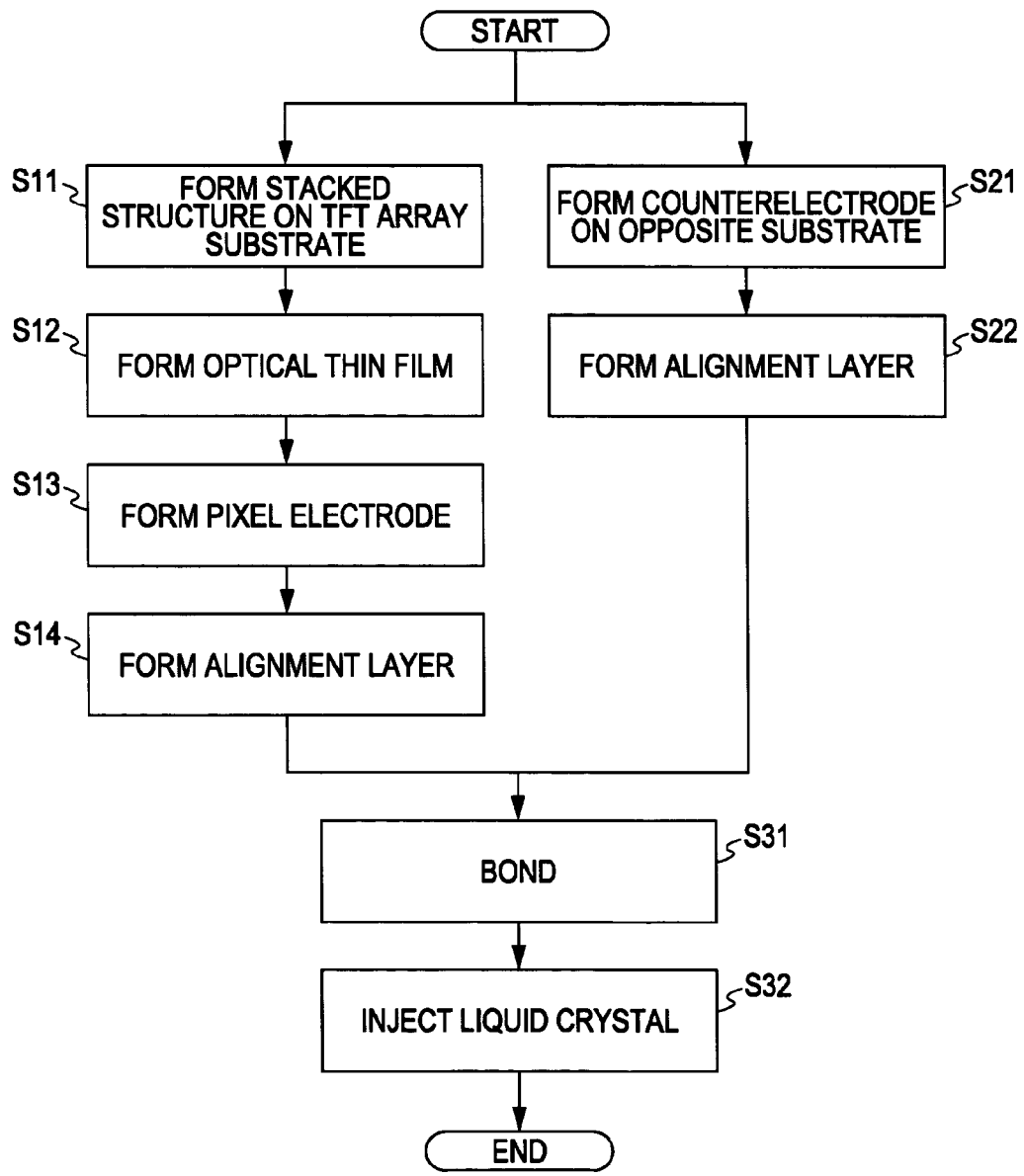

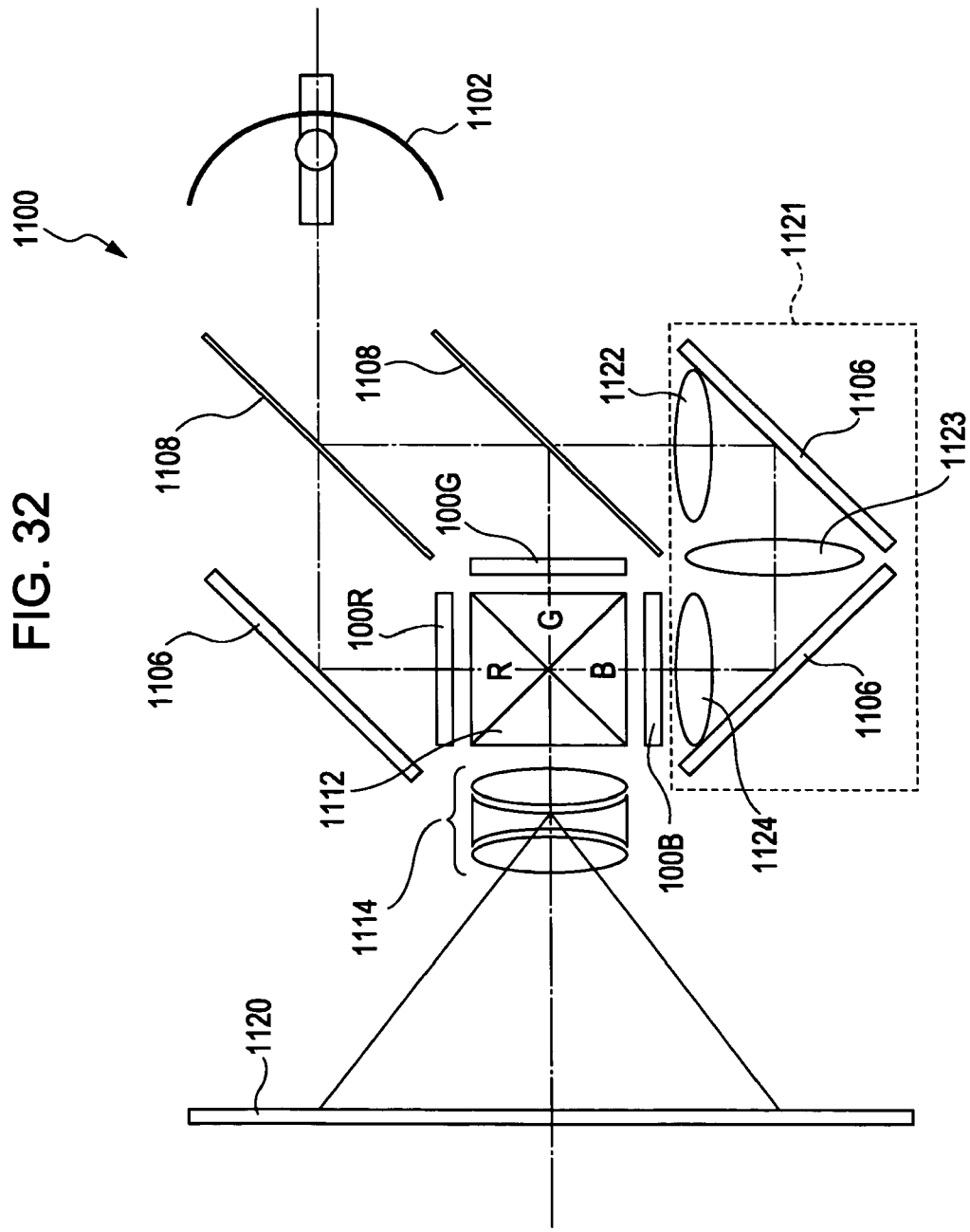

ELECTRO-OPTICAL DEVICE, MANUFACTURING METHOD THEREOF, AND ELECTRONIC APPARATUS

BACKGROUND

1. Technical Field

The present invention relates to an electro-optical device such as a liquid crystal display device including, for example, a first substrate, a second substrate facing the first substrate, with a sealing material interposed between the first and second substrates, and a liquid crystal layer placed in at least an effective pixel region between the first and second substrates, a manufacturing method thereof, and an electronic apparatus such as a liquid crystal projector having the electro-optical device.

2. Related Art

As widely known in the art, as one example of electro-optical devices, a liquid crystal display device has a structure where a liquid crystal layer is interposed between two substrates, each substrate being formed of a glass substrate, a quartz substrate or the like, a plurality of switching elements, such as thin-film transistors (TFTs), and a plurality of pixel electrodes are arranged in the form of a matrix on one of the two substrates, and a counter electrode is formed on the other of the two substrates. In the above-constructed liquid crystal display device, an image is displayed when an optical characteristic of the liquid crystal layer interposed between the two substrates is varied according to an image signal applied to the liquid crystal layer.

That is, when the image signal is supplied to the plurality of pixel electrodes (formed of indium tin oxide (ITO)) arranged in the form of a matrix through the switching elements such as TFTs and a voltage based on the image signal is applied to the liquid crystal layer between the pixel electrodes and the counter electrode, the alignment of liquid crystal molecules is varied. Accordingly, transmittance of the pixels is varied, and then, light that passes through the pixel electrodes and the liquid crystal layer is varied according to the image signal for display of an image.

In addition, an element substrate on which the TFTs are formed and an opposite substrate facing the element substrate are separately manufactured, and thereafter, are bonded together by means of, for example, a sealing material, which is applied circumferentially, with high precision (for example, within an alignment error of 1 µm) in a subsequent panel assembly process.

In the panel assembly process, first, alignment layers, which are made of, for example, polyimide, to align liquid crystal molecules along substrate surfaces are formed on surfaces of contact between the manufactured element substrate and opposite substrate and the liquid crystal layer. Thereafter, the alignment layers are fired and then rubbed to align the liquid crystal molecules with no application of voltage.

Next, the liquid crystal layer is interposed between the element substrate and the opposite substrate using a liquid crystal sealing method, for example. Specifically, the sealing material is circumferentially applied as an adhesive in a sealing material application region on one of the element substrate and the opposite substrate, with a liquid crystal injection hole formed in a portion of the sealing material. The element substrate and the opposite substrate are bonded together using the sealing material, and then, aligned with each other, compressed and cured. Thereafter, liquid crystals are injected through the liquid crystal injection hole formed in the portion of the sealing material, and then the liquid crystal injection hole is sealed by a sealant thermally cured, thereby completing assembly of the liquid crystal display device.

Such an assembly process of the liquid crystal display device, which is well known in the art, is disclosed in JP-A-9-222612 (hereinafter referred to as Patent Document 1), for example. Patent Document 1 proposes a sealant forming process in which a sealant is prevented from being peeled from an element substrate due to a crack occurring in the sealant by heat generated when the sealant is thermally cured by forming a sealant peel prevention pattern formed of a transparent electrode between the sealant and the element substrate, thereby improving the humidity resistance of the liquid crystal display device.

In the proposed sealant forming process, for example, after an alignment layer is formed on a surface of contact between the element substrate and a liquid crystal layer, a portion of the alignment, which is formed outside of an effective pixel region disposed in a region surrounded by the sealing material, is formed on a planarized insulating layer, which is made of, for example, silicon dioxide ($SiO_2$), boron silicate glass (BSG, i.e., boron-doped oxide film), boron phosphosilicate glass (BPSG, i.e., boron phosphate-doped oxide film) or the like and formed below the alignment layer.

However, since the alignment layer formed of polyimide does not adhere well to the insulating layer formed of the above-mentioned material, humidity penetrates into the effective pixel region through a gap between the insulating layer and the alignment layer while the assembled liquid crystal display device is used under high humidity conditions, which results in deterioration of the humidity resistance of the liquid crystal display device and hence deterioration of picture quality due to display spots.

In addition, in the process of rubbing the alignment layer, rubbing spots may appear such as stripes attached to a display region due to dust particles of the alignment layer the insulating layer when the alignment layer is rubbed.

The above problems are not limited to the insulating layer and also arise due to poor adhesion between the alignment layer and a layer formed below the alignment layer. However, the liquid crystal display device disclosed in Patent Document 1 does not consider the above problems. Accordingly, there is a need to improve the humidity resistance of the liquid crystal display device.

On the other hand, for display of an image in a liquid crystal display device, since incident light passes through not only a liquid crystal layer but also pixel electrodes and a counter electrode, it is desirable to increase transmittance of the pixel electrodes and the counter electrode in order to obtain higher picture quality. For example, JP-A-2005-140836 (hereinafter referred to as Patent Document 2) discloses a technique in which optical thin films, which are formed of, for example, nitride films, are attached immediately below pixel electrodes and a counter electrode, which are formed of ITO films, for increasing the transmittances of the pixel electrodes and the counter electrode.

However, the technique disclosed in Patent Document 2 also has a problem of deterioration of humidity resistance of the liquid crystal display device due to poor surface adhesion between the optical thin films formed of nitride films or the like and the alignment layer made of polyimide or the like.

SUMMARY

An advantage of some aspects of the invention is to provide an electro-optical device, which is capable of improving adhesion between an alignment layer and a layer formed below the alignment in order to prevent humidity from penetrating into an effective pixel region, thereby improving humidity resistance of the electro-optical device while preventing the alignment layer from being peeled from the layer formed below the alignment when the alignment layer is subjected to a rubbing treatment, a manufacturing method thereof, and an electronic apparatus having the electro-optical device. Another advantage of the invention is to provide an electro-optical device, which is capable of improving transmittance while maintaining humidity resistance, thereby making it possible to attain higher quality of picture, a manufacturing method thereof, and an electronic apparatus having the electro-optical device.

According to an aspect of the invention, there is provided an electro-optical device including a first substrate, a second substrate facing the first substrate, with a sealing material interposed between the first and second substrates, liquid crystals being interposed in at least an effective pixel region between the first and second substrates, including: an alignment layer that is formed on at least one of the first and second substrates immediately below the sealing material and aligns the liquid crystals; and a lower layer formed below the alignment layer. A transparent conductive layer that is firmly adhered to the alignment layer and the lower layer is formed in a region covering at least the sealing material between the alignment layer and the lower layer.

With this configuration, even when the electro-optical device is used under high humidity conditions, humidity can be prevented from penetrating from the outside of the device into a region defined by the sealing material of at least one of the first and second substrates through a gap between the alignment layer and the lower layer formed below the alignment layer. As a result, humidity resistance of the electro-optical device is improved. In addition, as the adhesion between the alignment layer and the lower layer is improved, the alignment layer can be prevented from being peeled from the lower layer.

An external connection terminal may be formed on at least one of the first and second substrates, and an electrode is formed in the effective pixel region, and the transparent conductive layer is formed on the entire surface of a region except the external connection terminal and the electrode between the alignment layer and the lower layer.

With this configuration, since the transparent conductive layer does not contact the external connection terminal and the electrode of the effective pixel region, there does not occur a circuit-short between external connection terminals or between electrodes. In addition, even when the device is used under high humidity conditions, humidity can be prevented from penetrating from the outside of the device into a region defined by the sealing material of at least one of the first and second substrates through a gap between the alignment layer and the lower layer formed below the alignment layer. As a result, humidity resistance of the electro-optical device is improved. In addition, as the adhesion between the alignment layer and the lower layer is improved, the alignment layer can be prevented from being peeled from the lower layer.

A groove may be formed in the region covering at least the sealing material at a surface of the lower layer that contacts the transparent conductive layer.

With this configuration, since a path of penetration of humidity is further prolonged by not only the transparent conductive layer but also the groove, compared to a case where there is no groove, even when the device is used under high humidity conditions, humidity can be reliably prevented from penetrating from the outside of the device into a region defined by the sealing material of at least one of the first and second substrates through a gap between the alignment layer and the lower layer formed below the alignment layer. As a result, humidity resistance of the electro-optical device is improved. In addition, as the adhesion between the alignment layer and the lower layer is improved by not only the transparent conductive layer but also the groove, the alignment layer can be prevented from being peeled from the lower layer.

According to another aspect of the invention, there is provided an electro-optical device including a first substrate, a second substrate facing the first substrate, with a sealing material interposed between the first and second substrates, liquid crystals being interposed in at least an effective pixel region between the first and second substrates, including: an alignment layer that is formed on at least one of the first and second substrates immediately below the sealing material and aligns the liquid crystals; and a lower layer formed immediately below the alignment layer. A groove is formed in a region covering at least the sealing material at a surface of the lower layer that contacts the transparent conductive layer.

With this configuration, since a path of penetration of humidity is further prolonged by the groove, compared to a case where there is no groove, even when the device is used under high humidity conditions, humidity can be reliably prevented from penetrating from the outside of the device into a region defined by the sealing material of at least one of the first and second substrates through a gap between the alignment layer and the lower layer formed below the alignment layer. As a result, humidity resistance of the electro-optical device is improved. In addition, as the adhesion between the alignment layer and the lower layer is improved by the groove, the alignment layer can be prevented from being peeled from the lower layer.

The lower layer may be formed of an insulating film.

With this configuration, even when the electro-optical device is used under high humidity conditions, humidity can be prevented from penetrating from the outside of the device into a liquid crystal region as an effective pixel region arranged in an inner side of the sealing material of at least one of the first and second substrates through a gap between the alignment layer and the insulating layer formed below the alignment layer, thereby preventing deterioration of image quality. As a result, humidity resistance of the electro-optical device is improved. In addition, as the adhesion between the alignment layer and the insulating layer is improved, the alignment layer can be prevented from being peeled from the insulating layer.

The transparent conductive layer may be formed of an ITO film.

With this configuration, even when the electro-optical device is used under high humidity conditions, humidity can be prevented from penetrating from the outside of the device into a liquid crystal region as an effective pixel region arranged in an inner side of the sealing material of at least one of the first and second substrates through a gap between the alignment layer and the insulating layer formed below the alignment layer, thereby preventing deterioration of image quality. As a result, humidity resistance of the electro-optical device is improved. In addition, as the adhesion between the alignment layer and the insulating layer is improved, the alignment layer can be prevented from being peeled from the insulating layer.

The groove may be circumferentially formed to surround the effective pixel region.

With this configuration, even when the electro-optical device is used under high humidity conditions, humidity can be prevented from penetrating from the outside of the device into a liquid crystal region as an effective pixel region arranged in an inner side of a region surround by the sealing material of at least one of the first and second substrates through a gap between the alignment layer and the insulating layer or the transparent conductive layer formed below the alignment layer, thereby reliably preventing deterioration of image quality. As a result, humidity resistance of the electro-optical device is improved.

The groove may have a closed loop shape.

With this configuration, even when the electro-optical device is used under high humidity conditions, humidity can be prevented from penetrating from the outside of the device into a liquid crystal region as an effective pixel region arranged in an inner side of a region surround by the sealing material of at least one of the first and second substrates through a gap between the alignment layer and the insulating layer or the transparent conductive layer formed below the alignment layer in any direction of the electro-optical device, thereby reliably preventing deterioration of image quality. As a result, humidity resistance of the electro-optical device is improved.

The groove may be plural in number.

With this configuration, even when the electro-optical device is used under high humidity conditions, humidity can be prevented from penetrating from the outside of the device into a liquid crystal region as an effective pixel region arranged in an inner side of a region surround by the sealing material of at least one of the first and second substrates through a gap between the alignment layer and the insulating layer or the transparent conductive layer formed below the alignment layer, thereby reliably preventing deterioration of image quality. As a result, humidity resistance of the electro-optical device is improved.

A surface of at least one of the first and second substrates, which contacts the sealing material, may have an uneven section formed by the groove.

An opening edge of the groove, which is formed by the surface of at least one of the first and second substrates, which contacts the sealing material, and the groove, may have a right-angled section.

An opening edge of the groove, which is formed by the surface of at least one of the first and second substrates, which contacts the sealing material, and the groove, may be curved, or have an obtuse-angled section.

According to still another aspect of the invention, there is provided a method of manufacturing an electro-optical device including a first substrate, a second substrate facing the first substrate, with a sealing material interposed between the first and second substrates, liquid crystals being interposed in at least an effective pixel region between the first and second substrates, including the steps of: forming a groove on a surface of at least one of the first and second substrates; forming a transparent conductive layer on at least a region in which the groove is formed on the surface; forming an alignment layer to align the liquid crystals on at least the transparent conductive layer; and forming the sealing material in a region on the alignment layer above the region in which the groove is formed.

With this configuration, even when the electro-optical device is used under high humidity conditions, humidity can be prevented from penetrating from the outside of the device into a liquid crystal region as an effective pixel region arranged in an inner side of the sealing material of at least one of the first and second substrates through a gap between the alignment layer and the insulating layer formed below the alignment layer, thereby preventing deterioration of image quality. As a result, humidity resistance of the electro-optical device is improved. In addition, as the adhesion between the alignment layer and the insulating layer is improved, the alignment layer can be prevented from being peeled from the insulating layer.

According to still another aspect of the invention, there is provided a method of manufacturing an electro-optical device including a first substrate, a second substrate facing the first substrate, with a sealing material interposed between the first and second substrates, liquid crystals being interposed in at least an effective pixel region between the first and second substrates, including the steps of: forming a groove on a surface of at least one of the first and second substrates; forming an alignment layer to align the liquid crystals on at least the surface; and forming the sealing material in a region on the alignment layer above the region in which the groove is formed.

With this configuration, since a path of penetration of humidity is further prolonged by the groove, compared to a case where there is no groove, even when the device is used under high humidity conditions, humidity can be reliably prevented from penetrating from the outside of the device into a liquid crystal region as an effective pixel region arranged in an inner side of the sealing material of at least one of the first and second substrates through a gap between the alignment layer and the insulating layer formed below the alignment layer, thereby preventing deterioration of image quality. As a result, humidity resistance of the electro-optical device is improved. In addition, as the adhesion between the alignment layer and the insulating layer is improved by the groove, the alignment layer can be prevented from being peeled from the insulating layer.

The groove may be formed by dry etching, and an opening edge of the groove, which is formed by the surface and the groove, has a right-angled section.

The groove may be formed by wet etching, and an opening edge of the groove, which is formed by the surface and the groove, is curved, or has an obtuse-angled section.

According to still another aspect of the invention, there is provided an electronic apparatus having an electro-optical device including a first substrate, a second substrate facing the first substrate, with a sealing material interposed between the first and second substrates, liquid crystals being interposed in at least an effective pixel region between the first and second substrates, the electro-optical device including: an alignment layer that is formed on at least one of the first and second substrates immediately below the sealing material and aligns the liquid crystals; and a lower layer formed below the alignment layer. A transparent conductive layer that is firmly adhered to the alignment layer and the lower layer is formed in a region covering at least the sealing material between the alignment layer and the lower layer.

With this configuration, even when the device is used under high humidity conditions, humidity can be reliably prevented from penetrating from the outside of the device into a liquid crystal region as an effective pixel region arranged in an inner side of the sealing material of at least one of the first and second substrates through a gap between the alignment layer and the insulating layer formed below the alignment layer, thereby preventing deterioration of image quality. As a result, humidity resistance of the electro-optical device and hence the electronic apparatus is improved. In addition, as the adhesion between the alignment layer and the insulating layer is improved, the alignment layer can be prevented from being peeled from the insulating layer.

According to still another aspect of the invention, there is provided an electronic apparatus having an electro-optical device including a first substrate, a second substrate facing the first substrate, with a sealing material interposed between the first and second substrates, liquid crystals being interposed in at least an effective pixel region between the first and second substrates, the electro-optical device including: an alignment layer that is formed on at least one of the first and second substrates immediately below the sealing material and aligns the liquid crystals; and a lower layer formed immediately below the alignment layer. A groove is formed in a region covering at least the sealing material at a surface of the lower layer that contacts the transparent conductive layer.

With this configuration, since a path of penetration of humidity is further prolonged by the groove, compared to a case where there is no groove, even when the device is used under high humidity conditions, humidity can be reliably prevented from penetrating from the outside of the device into a liquid crystal region as an effective pixel region arranged in an inner side of the sealing material of at least one of the first and second substrates through a gap between the alignment layer and the insulating layer formed below the alignment layer, thereby preventing deterioration of image quality. As a result, humidity resistance of the electro-optical device and hence the electronic apparatus is improved. In addition, as the adhesion between the alignment layer and the insulating layer is improved, the alignment layer can be prevented from being peeled from the insulating layer.

According to still another aspect of the invention, there is provided an electro-optical device including: a pair of first and second substrates with an electro-optical material interposed between the first and second substrates; a pixel electrode formed of a transparent conductive layer formed on the first substrate; an alignment layer that is formed on the pixel electrode and controls an alignment state of the electro-optical material; a sealing material that bonds the first and second substrates together in a seal region to surround a display region in which the pixel electrode is formed; an optical thin film that is stacked between the first substrate and the pixel electrode and has a middle refractive index between a refractive index of the first substrate and a refractive index of the pixel electrode; and a seal low-side layer that is formed in at least a portion of the seal region on the first substrate and is formed of the same film as the pixel electrode.

With this configuration, the pair of first and second substrates are alternately bonded to each other by the sealing material in the seal region to surround the display region, and, for example, liquid crystals as the electro-optical material are interposed between the pair of first and second substrates. The first substrate has a stacked structure where switching transistors and wiring lines such as scan lines, data lines and the like are stacked on, for example, a glass substrate, and an interlayer insulating layer formed of non-silicate glass (NSG) or a silicon oxide film is formed on the uppermost layer. The second substrate is formed of, for example, a glass substrate. On the first substrate are arranged transparent pixel electrodes formed of a transparent conductive film such as an ITO film, for example, in the form of a matrix, and on the second substrate is provided an counter electrode formed of a conductive film such as an ITO film in the opposite to the pixel electrodes. In a condition where the electro-optical device is inactivated, the electro-optical material has a particular alignment state between the pair of first and second substrates by the alignment layer made of organic material such as polyimide or inorganic material such as silica ($SiO_2$) and a surface shape effect at the alignment layer provided on the counter electrode. When the electro-optical device is activated, an alignment state of liquid crystal molecules is varied by a voltage applied to a liquid crystal layer between the pixel electrodes and the counter electrode based on an image signal. Light transmittance for each pixel is varied by the variation of the alignment state of the liquid crystal molecules. Accordingly, light that passes through the liquid crystal layer is varied depending on the image signal for display of an image in the display region.

In the invention, particularly, the optical thin film that has a middle refractive index between a refractive index of the first substrate and a refractive index of the pixel electrodes and is formed of a silicon nitride film (SiN film), a silicon oxynitride film (SiON film) is arranged between the first substrate and the pixel electrodes in the stacked structure of the first substrate. The optical thin film is typically formed on the entire surface of the first substrate. That is, the optical thin film having a refractive index of 1.6 to 1.8 (i.e., more than 1.6 and less than 1.8), for example, and the pixel electrode having a refractive index of 2.0, for example, are stacked in order adjacent to the first substrate having a refractive index of 1.4, for example. Here, "middle refractive index" means that the optical thin film has a refractive index smaller than the refractive index of the first substrate and larger than the refractive index of the pixel electrodes if the refractive index of the first substrate is larger than the refractive index of the pixel electrodes, and the optical thin film has a refractive index larger than the refractive index of the first substrate and smaller than the refractive index of the pixel electrodes if the refractive index of the first substrate is smaller than the refractive index of the pixel electrodes, that is, the optical thin film has any refractive index between both refractive indexes. That is, the middle refractive index is limited as the midst refractive index. Accordingly, the optical thin film can increase transmittance when light incident from a pixel electrode side passes through the pixel electrodes and is emitted into the first substrate. In other words, if the pixel electrodes are provided adjacent to the first substrate with no measure, there occurs a relatively large interfacial reflection at an interface between the pixel electrodes and the first substrate due to a relatively large difference in refractive index between the first substrate and the pixel electrodes. According to the invention, this interfacial reflection can be reduced by the optical thin film having the middle refractive index. Accordingly, the transmittance can be increased when the light passes through the pixel electrodes and is emitted into the first substrate.

In addition, in the invention, particularly, the seal low-side layer formed of the same film as the pixel electrodes is provided in at least a portion of the seal region on the first substrate when viewed in plan from the top of the first substrate. Here, "the same film" means the same kind film formed at the same time in a manufacturing process. "Formed of the same film" means that the seal low-side layer is basically formed of separate portions of the same film, not one sheet of continuous film. That is, the seal low-side layer is formed of the same film as the pixel electrode formed of, for example, an ITO film, and is partially formed in at least the seal region. In other words, the optical thin film, the seal low-side layer and the alignment layer are stacked in order in at least a portion of the seal region. Accordingly, an area of an interface between the alignment layer and the optical thin film in the seal region on the first substrate is reduced. In other words, an interface between the alignment layer and the seal low-side layer and an interface between the seal low-side layer and the optical thin film are formed in the seal region on the first substrate, instead of an interface between the alignment layer and the optical thin film. Accordingly, humidity can be prevented from penetrating from the outside into the display region via the interface between the alignment layer and the optical thin film due to low adhesion at the interface between the alignment layer, which is made of, for example, organic material such as polyimide or inorganic material such as silica ($SiO_2$), and the optical thin film which is formed of, for example, a silicon nitride film, a silicon oxynitride film or the like. In other words, high interface adhesion can be obtained by forming the interface between the alignment layer and the seal low-side layer and the interface between the seal low-side layer and the optical thin film, which have adhesion higher than that of the interface between the alignment layer and the optical thin film, in at least a portion of the seal region. Accordingly, humidity resistance of the device can be improved, which results in improvement of reliability of the device. The seal low-side layer may be provided in a portion of periphery of the display region other than the seal region without limiting within the seal region.

In addition, since the seal low-side layer is formed of the same film as the pixel electrodes, as described above, the humidity resistance of the device can be improved without causing complexity of a stacked structure on the first substrate or complexity of a manufacturing process.

In addition, as the seal low-side layer is formed in at least a portion of the seal region, rubbing remnants such as abrasion dusts of rubbing cross, which may occur during rubbing due to steps of a surface of the first substrate and a surface of the pixel electrode, become apt to remain in the region in which the seal low-side layer is formed. In other words, rubbing remnants can be prevented from remaining in the display region and hence having an effect on image quality.

As described above, with this configuration, humidity resistance can be maintained by the seal low-side layer which is provided in at least a portion of the seal region and is formed of the same film as the pixel electrodes, while the transmittance can be improved by the optical thin film provided immediately below the pixel electrodes, thereby obtaining high image quality. In addition, reliability of the device can be improved without causing complexity of a stacked structure on the first substrate or complexity of a manufacturing process.

The seal low-side layer has the same plane pattern as the pixel electrode when viewed in plan from the top of the first substrate.

With this configuration, the seal low-side layer is formed in the same plane pattern as the pixel electrode when viewed in plan from the top of the first substrate. That is, when the pixel electrode is patterned in the form of a matrix from the transparent conductive layer in the display region, the seal low-side layer is also formed in the same plane pattern (that is, the plane pattern in the form of a matrix) from the transparent conductive layer formed of the same film as the pixel electrode in the seal region. In other words, in general, a pattern of pixel electrodes, which form dummy pixels formed in a frame region between the seal region and the display region, is formed up to the seal region. Accordingly, it is easy to form the seal low-side layer in the same process as the pixel electrode. That is, it is possible to form the seal low-side layer in the same process without alternating most of the process for forming the pixel electrode.

The seal low-side layer may have a first portion that is formed in the seal region and surrounds the display region when viewed in plan from the top of the first substrate.

With this configuration, since the first portion of the seal low-side layer is continuously formed to surround the display region, humidity can be prevented from penetrating from the outside into the display region. That is, as the first portion functions as a barrier that isolates the display region from the outside, a path of penetration of humidity can be mostly or completely blocked. Accordingly, humidity resistance of the device can be further improved. In addition, as the interface between the alignment layer and the seal low-side layer and the interface between the seal low-side layer and the optical thin film are formed in the region in which the seal low-side layer is formed, high interface adhesion can be obtained.

The seal low-side layer may have a plurality of second portions that are separately formed in the seal region and surround the display region when viewed in plan from the top of the first substrate.

With this configuration, the plurality of second portions are arranged in rows in such a manner that one portion blocks arranged gaps of another portion in a direction crossing a direction from the seal region to the display region. Accordingly, as the plurality of portions function as a barrier that isolates the display region from the outside, a path of penetration of humidity can be blocked as the path becomes complex or extended. Accordingly, humidity resistance of the device can be further improved. In addition, as the interface between the alignment layer and the seal low-side layer and the interface between the seal low-side layer and the optical thin film are formed in the region in which the seal low-side layer is formed, high interface adhesion can be obtained.

The transparent conductive layer may be formed of an ITO film.

With this configuration, as the optical thin film is provided between the pixel electrode formed of the ITO film having relatively low transmittance and the first substrate, the overall transmittance of the first substrate, the optical thin film and the pixel electrode can be improved.

The optical thin film may have a refractive index of 1.6 to 1.8.

With this configuration, interfacial reflection can be effectively reduced by the optical thin film having the refractive index of 1.6 to 1.8 (i.e., more than 1.6 and less than 1.8), which is formed between the first substrate having the refractive index of about 1.4 and the pixel electrode formed of the ITO film having the refractive index of about 2. Accordingly, the transmittance can be effectively reduced.

An optical absorption coefficient of the optical thin film may be smaller than an optical absorption coefficient of the transparent conductive layer.

With this configuration, since loss of light when light passes through the optical thin film, that is, deterioration of the light intensity, can be prevented, the transmittance can be more reliably improved.

The optical thin film may include at least one of an inorganic nitride film and an inorganic oxynitride film.

With this configuration, since the optical thin film is formed of at least one of a nitride film such as a silicon nitride film (SiN) and an oxynitride film such as a silicon oxynitride film (SiON), it is easy to provide the optical thin film having a middle refractive index between the refractive index of the pixel electrode and the refractive index of the first substrate. Accordingly, the transmittance can be more reliably and easily improved.

The alignment layer may be made of polyimide.

With this configuration, since the interface between the alignment layer made of polyimide and the optical thin film formed of the nitride film such as the silicon nitride film or the oxynitride film such as the silicon oxynitride film has high adhesion in a portion of the seal region, humidity resistance of the device can be improved.

According to still another aspect of the invention, there is provided an electronic apparatus having the electro-optical device according to one of the above aspects of the invention.

Since the electronic apparatus according to still another aspect of the invention has the electro-optical device according to one of the above aspects of the invention, various electronic apparatuses with high quality of image, including a projection type display apparatus, a television, a mobile telephone, an electronic pocket notebook, a word processor, a view finder type or monitor direct-view type video tape recorder, a workstation, a video conference telephone, a POS terminal, an apparatus equipped with a touch panel, etc. can be realized.

In addition, since the electronic apparatus according to still another aspect of the invention may include an electrophoresis display device such as an electronic paper, a field emission display device, a conduction electron-emitter display device, an electrophoresis display device thereof, and a display apparatus using the field emission display device or the conduction electron-emitter display device.

According to still another aspect of the invention, there is provided a method of manufacturing an electro-optical device including a pair of first and second substrates, with an electro-optical material interposed between the first and second substrates, and a pixel electrode formed on the first substrate, including the steps of; forming an optical thin film on the first substrate, the optical thin film having a middle refractive index between a refractive index of the first substrate and a refractive index of the pixel electrode; forming the pixel electrode in a display region on the first substrate by stacking a transparent conductive layer on the optical thin film; forming an alignment layer on the pixel electrode, the alignment layer controlling an alignment state of the electro-optical material; and bonding the first and second substrates together by means of a sealing material in a seal region to surround the display region. The step of forming the pixel electrode includes forming a seal low-side layer in at least a portion of the seal region on the first substrate from the same film as the pixel electrode.

With this configuration, the electro-optical device according to the above aspects of the invention can be manufactured. Particularly, humidity resistance can be maintained by the seal low-side layer which is provided in at least a portion of the seal region and is formed of the same film as the pixel electrodes in the pixel electrode forming process, while the transmittance can be improved by the optical thin film provided immediately below the pixel electrodes in the optical thin film forming process. Accordingly, an electro-optical device with high image quality can be manufacture. In addition, since the seal low-side layer is formed in the pixel electrode forming process, complexity of the manufacturing process is not caused at all.

Other properties, utilities and characteristics of the invention become apparent from the following detailed description through exemplary embodiments when read in conjunction with the accompanying drawings.

BRIEF DESCRIPTION OF THE DRAWINGS

The invention will be described with reference to the accompanying drawings, wherein like numbers reference like elements.

FIG. 31 is a flow chart illustrating steps of a manufacturing process of the liquid crystal display device according to the fourth embodiment of the invention.

FIG. 32 is a view showing a configuration of a projector as one example of electronic apparatuses to which an electro-optical device is applied.

DESCRIPTION OF EXEMPLARY EMBODIMENTS

Hereinafter, preferred embodiments of the invention will be described with reference to the accompanying drawings. In the following embodiments, an electro-optical device will be described by way of example of a liquid crystal display device.

First Embodiment

First, a first embodiment of the invention will be described.

Figure 1:
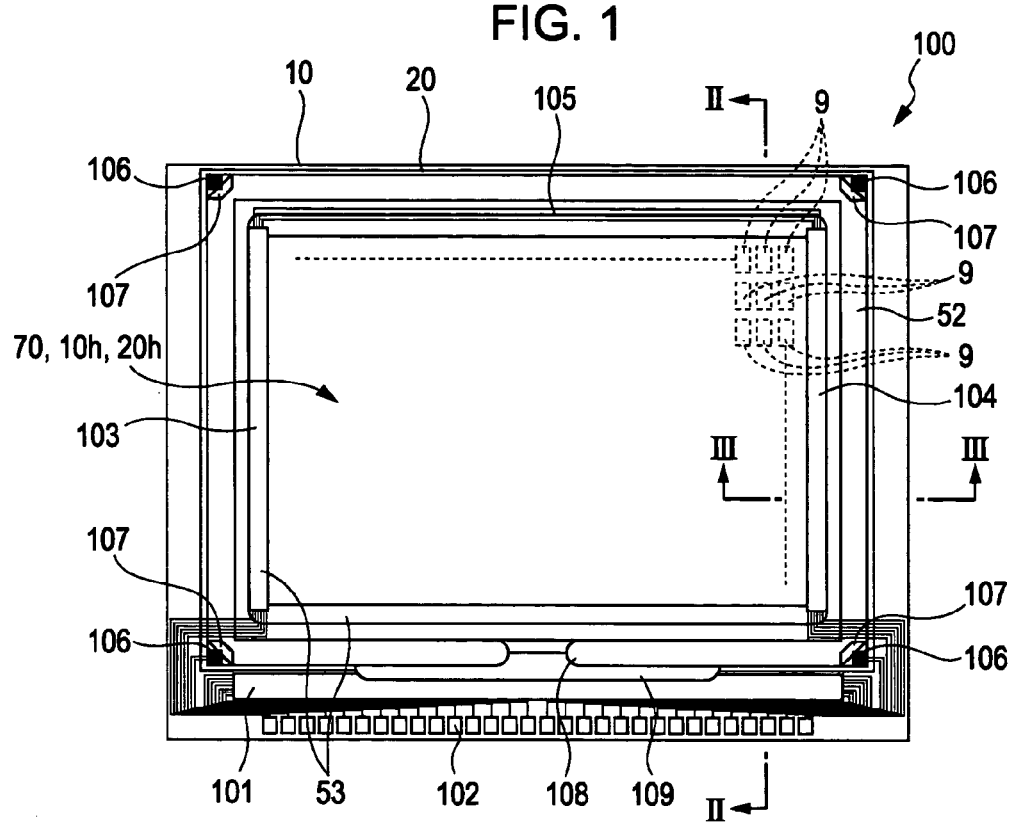
FIG. 1 is a plan view of a liquid crystal display device according to a first embodiment of the invention.
Figure 2:
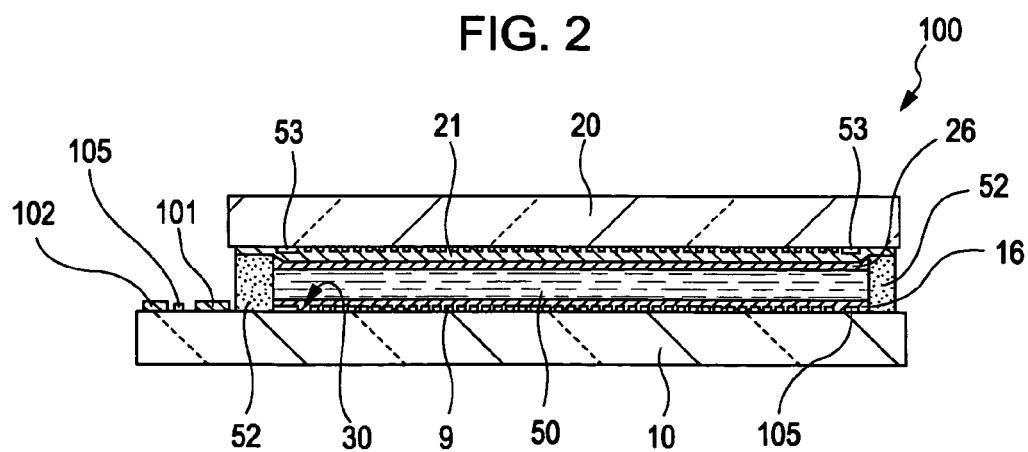
FIG. 2 is a sectional view taken along line II-II of FIG. 1.

FIG. 1 is a plan view of a liquid crystal display device according to a first embodiment, and FIG. 2 is a sectional view taken along line II-II of FIG. 1.

As shown in FIGS. 1 and 2, a liquid crystal display device 100 includes a TFT substrate 10, as a first substrate, which is formed of, for example, a quartz substrate, a glass substrate or a silicon substrate, an opposite substrate 20, as a second substrate, which faces the TFT substrate 10 and is formed of, for example, a glass substrate or a quartz substrate, and a liquid crystal layer 50 which is constituted by an electro-optical material and is interposed between the TFT substrate 10 and the opposite substrate 20. The TFT substrate 10 and the opposite substrate 20 are bonded together by a sealing material 52.

A display region 10h of the TFT substrate 10, which constitutes an effective pixel region (hereinafter, referred to as a display region) 70 of the liquid crystal display device 100, is formed at a side of surface of contact between the TFT substrate 10 and the liquid crystal layer 50 on the TFT substrate 10. In addition, a plurality of pixel electrodes (made of ITO) 9 that forms pixels are arranged in the form of a matrix on the entire surface of the display region 10h.

In addition, a counter electrode (made of ITO) 21 is provided on the entire surface of the opposite substrate 20, and a non-display region 20h of the opposite substrate 20, which constitutes the display region 70 of the liquid crystal display device 100, is formed at a side of surface of contact between the opposite substrate 20 and the liquid crystal layer 50 in the opposite of the display region 10h of the TFT substrate 10.

An alignment layer 16 that is subjected to a rubbing treatment is provided on the pixel electrodes 9 of the TFT substrate 10, and an alignment layer 26 that is subjected to a rubbing treatment is provided on the opposite electrode 21 formed on the entire surface of the opposite substrate 20.

Each of the alignment layers 16 and 22 is formed of a transparent organic film such as a polyimide film or the like. In addition, the alignment layers 16 and 22 faces with each other when the TFT substrate 10 is arranged in the opposite of the opposite substrate 20.

In addition, in the display region 10h of the TFT substrate 10, a plurality of scan lines (not shown) and a plurality of data lines (not shown) are formed, intersecting with each other, and the pixel electrodes 9 are arranged in the form of a matrix in regions defined by the scan lines and the data lines. In addition, thin film transistors (TFTs) 30 are provided at intersections of the scan lines and the data lines and are connected to respective pixel pixels 9.

The TFTs 30 are turned of an ON signal from the scan lines, and accordingly, an image signal supplied to the data lines is supplied to the pixel electrodes 9. A voltage between the pixel electrodes 9 and the counter electrode 21 which is formed on the opposite substrate 20 is applied to the liquid crystal layer 50.

In addition, storage capacitors (not shown) are arranged in parallel to the pixel electrodes 9. These storage capacitors allow a voltage of the pixel electrodes 9 to be maintained for a period of time longer by, for example, a number of three ciphers than a period of time for which a source voltage is applied. Also, the storage capacitors improve a voltage sustenance characteristic and allow display of an image with a high contrast ratio.

On the opposite substrate 20 is formed a light shield film 53 as a frame defining a display region by defining and partitioning a circumference of the display region 10h of the TFT substrate 10 and a circumference of the display region 20h of the opposite substrate 20.

When liquid crystals are injected between the TFT substrate 10 and the opposite substrate 20 by an existing liquid crystal injection method in order to form the liquid crystal layer 50, the sealing material 52 is circumferentially applied along 3 sides around the display region, with one side of the display region lacking the sealing material 52.

A liquid crystal injection hole 108 is formed on the one side of the display region lacking the sealing material 52 through which the liquid crystals are injected between the TFT substrate 10 and the opposite substrate 20. After the liquid crystals are injected, the liquid crystal injection hole 108 is sealed by a sealant 109.

In an outer region of the sealing material 52 are provided a data line driving circuit 101, which is a driver for driving the data lines (not shown) of the TFT substrate 10 by supplying an image signal to the data lines at a predetermined timing, and external connection terminals 102 for connection with an external circuit along one side of the TFT substrate 10.

Scan line driving circuits 103 and 104 are provided along two sides adjacent to the one side of the TFT substrate 10 which are drivers for driving gate electrodes (not shown) of the TFTs 30 by supplying a scan signal to the scan lines of the TFT substrate 10 and the gate electrodes at a predetermined timing. The scan line driving circuits 103 and 104 are formed on the TFT substrate 10 opposite the light shield film 53 formed in an inner side of the sealing material 52.

In addition, wiring lines 105 are provided on the TFT substrate 10 for interconnecting the data line driving circuit 101, the scan line driving circuits 103 and 104, the external connection terminals 102, and upper and lower conductive terminals 107 opposite three sides of the light shield film 53.

The upper and lower conductive terminals 107 are formed at four corners of the sealing material 52 on the TFT substrate 10. In addition, upper and lower conductors 106 are provided between the TFT substrate 10 and the opposite substrate 20, each of which has a lower end that contacts a corresponding upper and lower conductive terminal 107 and an upper end that contacts the counter electrode 21. The upper and lower conductors 106 allow electrical conduction between the TFT substrate 10 and the opposite substrate 20.

In addition, on the TFT substrate 10 formed of a quartz substrate, a glass substrate, a silicon substrate or the like are stacked various components including the pixel electrodes 9, the alignment layer 16 and the TFTs 30. This stacked structure is well known in the art, and therefore, explanation thereof will be omitted except for a stacked configuration in the vicinity of the alignment layer 16 which is the outermost layer of the TFT substrate 10 in this embodiment. This stacked configuration will be described below with reference to FIGS. 3 and 4.

Figure 3:
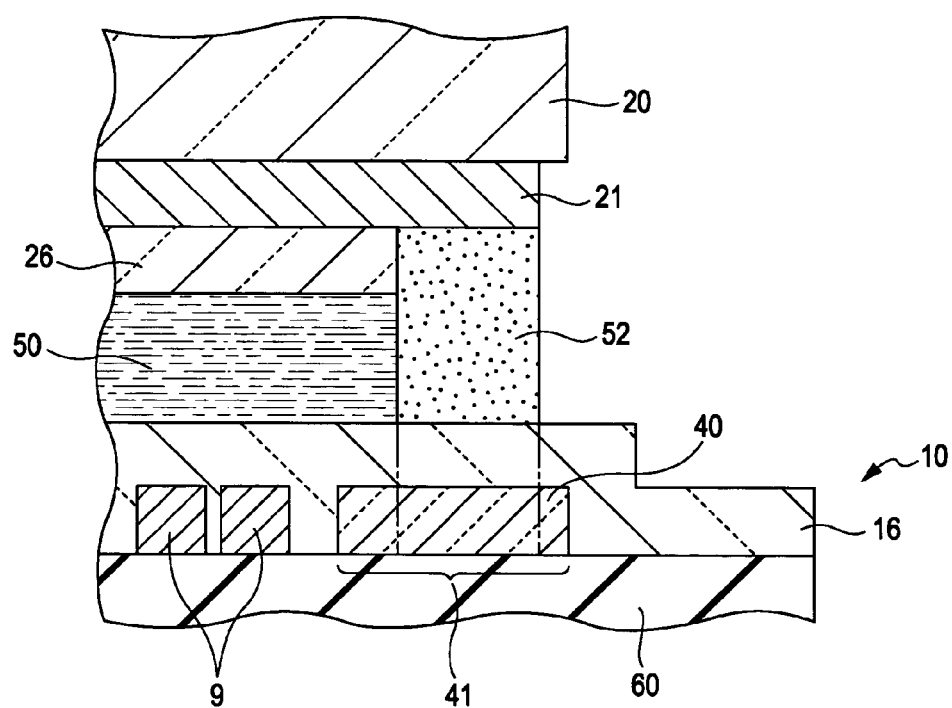
FIG. 3 is a partial sectional view taken along line III-III of FIG. 1.
Figure 4:
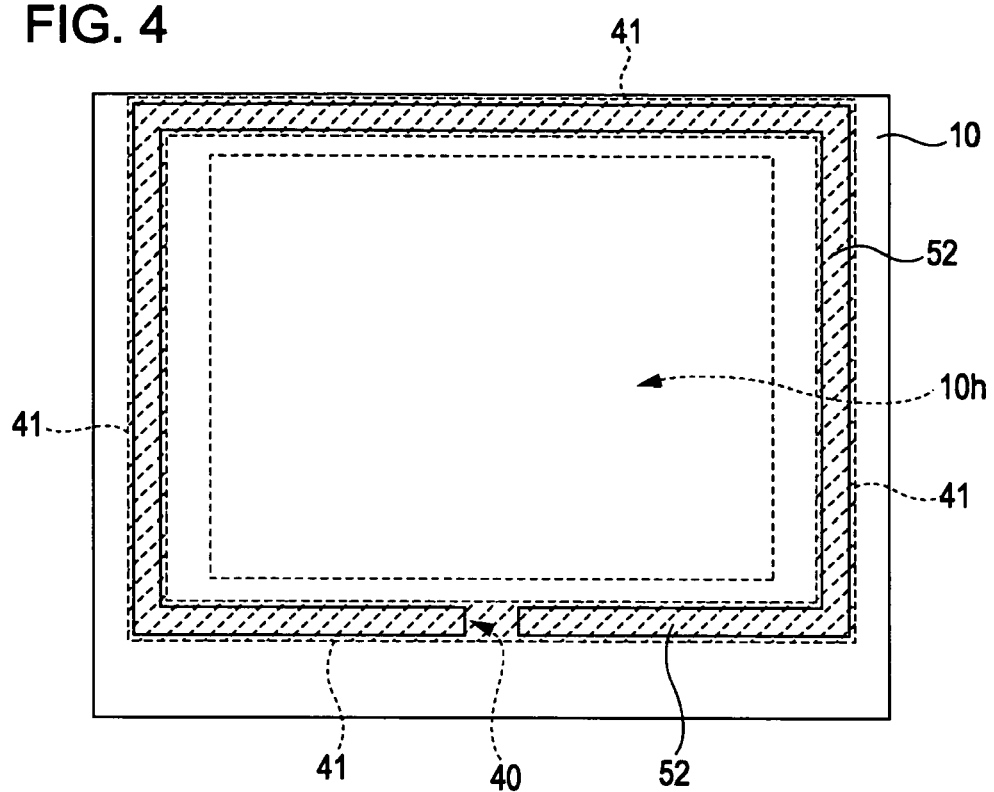
FIG. 4 is a plan view of a TFT substrate of FIG. 1, roughly showing a transparent conductive film forming region in plane.

FIG. 3 is a partial sectional view taken along line III-III of FIG. 1, and FIG. 4 is a plan view of a TFT substrate of FIG. 1, showing a transparent conductive film forming region. In FIG. 3, the light shield film 53, the scan line driving circuit 104, the wiring lines 105 and the like are omitted for clarity of the figure.

Also, In FIG. 4, the light shield film 53, the data line driving circuit 101, the external connection terminals 102, the scan line driving circuits 103 and 104, the wiring lines 105, the upper and lower conductors 106, the upper and lower conductive terminals 107, the sealant 109 and the like are omitted for clarity of the figure.

As shown in FIG. 3, the alignment layer 16 formed of a transparent organic film such as a polyimide film or the like is formed immediately below the sealing material 52 of the TFT substrate 10. In addition, an insulating layer 60 which is formed of, for example, ozone (O3) tetraethoxysilane (TEOS), silicon dioxide (SiO2), boron silicate glass (BSG, i.e., boron-doped oxide film), boron phosphosilicate glass (BPSG, i.e., boron phospho-doped oxide film) or the like is disposed below the alignment layer 16. The insulating layer 60 is formed by an atmospheric CVD or the like.

In addition, a transparent conductive layer 40 firmly adhered to the insulating layer and the alignment layer 16 is formed between the insulating 60 and the alignment layer 16, as shown in FIG. 3, and in a region completely covering, or at least overlapping, at least the sealing material 52, as shown by a dotted line in FIG. 4, that is, a transparent conductive layer forming region 41 covering a lower portion of the sealing material 52 of FIG. 3. In FIG. 4, the transparent conductive layer 40 is shown by a dotted oblique line.

When the sealing material 52 is circumferentially applied, as shown in FIG. 4, the transparent conductive layer 40 formed in the transparent conductive layer forming region 41 has a closed loop shape along the sealing material 52.

The transparent conductive layer 40 is made of the same material as the pixel electrodes 9, for example, ITO, and is formed with the same thickness as the pixel electrodes 9 in the same process as the pixel electrodes 9.

The transparent conductive layer 40 may be made of a material other than ITO as long as it can adhere well to the insulating layer 60 and the alignment layer 16. In addition, the transparent conductive layer 40 may be formed in a process separated from the process for the pixel electrodes 9 and with a thickness different from the thickness of the pixel electrodes 9.

In addition, the transparent conductive layer 40 is floated with respect to the pixel electrodes 9 or other conductive members, and accordingly, may be formed with no direct contact with the pixel electrodes 9 or other conductive members. Thus, no short circuit occurs between the pixel electrodes 9 and between other conductive members.

In this way, in this embodiment, the transparent conductive layer 40 firmly adhered to the insulating layer 60 and the alignment layer 16 is formed in the transparent conductive layer forming region 41 covering the sealing material 52 between the insulating layer 60 and the alignment layer 16.

With this configuration, even when the liquid crystal display device 100 is used under high humidity conditions, since the alignment layer 16 is firmly adhered to the insulating layer 60 through the transparent conductive layer 40, humidity can be prevented from penetrating from the outside of the liquid crystal display device 100 into the display region 10h of the TFT substrate 10, which is disposed in the region surrounded by the sealing material 52, through a gap between the alignment layer 16 and the insulating layer 60 formed below the alignment layer 16, thereby being prevented from mixing with the liquid crystals, which results in prevention of deterioration of picture quality due to display spots. As a result, the humidity resistance of the electro-optical device is improved.

In addition, as the adhesion between the alignment layer 16 and the insulating layer 60 is increased by the transparent conductive layer 40, the alignment layer 16 can be prevented from being peeled from the insulating layer 60 when the alignment layer 16 is rubbed, thereby preventing occurrence of rubbing spots such as stripes attached on the display region 10h due to dust particles of the alignment layer 16 from the insulating layer 60.

Figure 5:
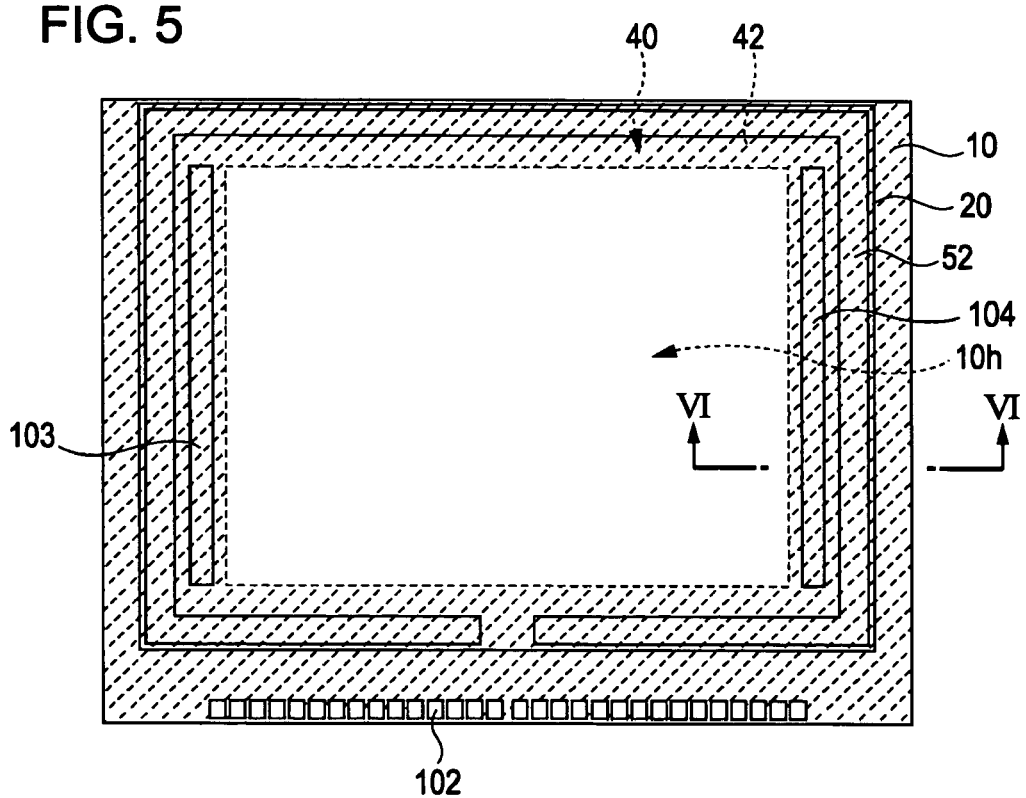
FIG. 5 is a front view of a liquid crystal display device, roughly showing a modification of the transparent conductive film forming region according to the first embodiment.

Hereinafter, a modification of this embodiment will be described. FIG. 5 is a front view of a liquid crystal display device, roughly showing a modification of the transparent conductive film forming region according to the first embodiment, FIG. 6 is a partial sectional view taken along line VI-VI of FIG. 5, and FIG. 7 is a partial sectional view of a liquid crystal display device, showing a modification of an externally exposed transparent conductive film.

In FIG. 5, the light shield film 53, the data line driving circuit 101, the wiring lines 105, the upper and lower conductors 106, the upper and lower conductive terminals 107, the sealant 109 and the like are omitted for clarity of the figure. In FIGS. 6 and 7, the light shield film 53, the scan line driving circuit 104, the wiring lines 105 and the like are omitted for simplicity.

In the above embodiment, the transparent conductive layer 40 is formed in the transparent conductive layer forming region 41 covering the sealing material 52 between the insulating layer 60 and the alignment layer 16.

Figure 6:
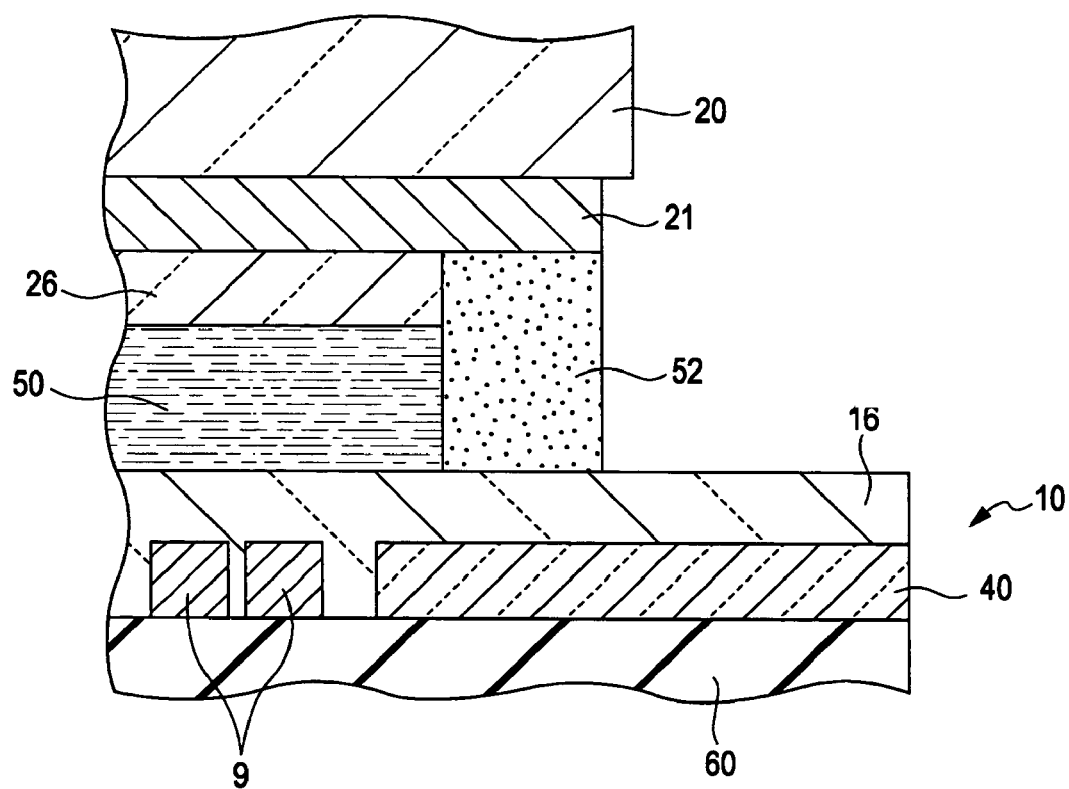
FIG. 6 is a partial sectional view taken along line VI-VI of FIG. 5.
Figure 7:
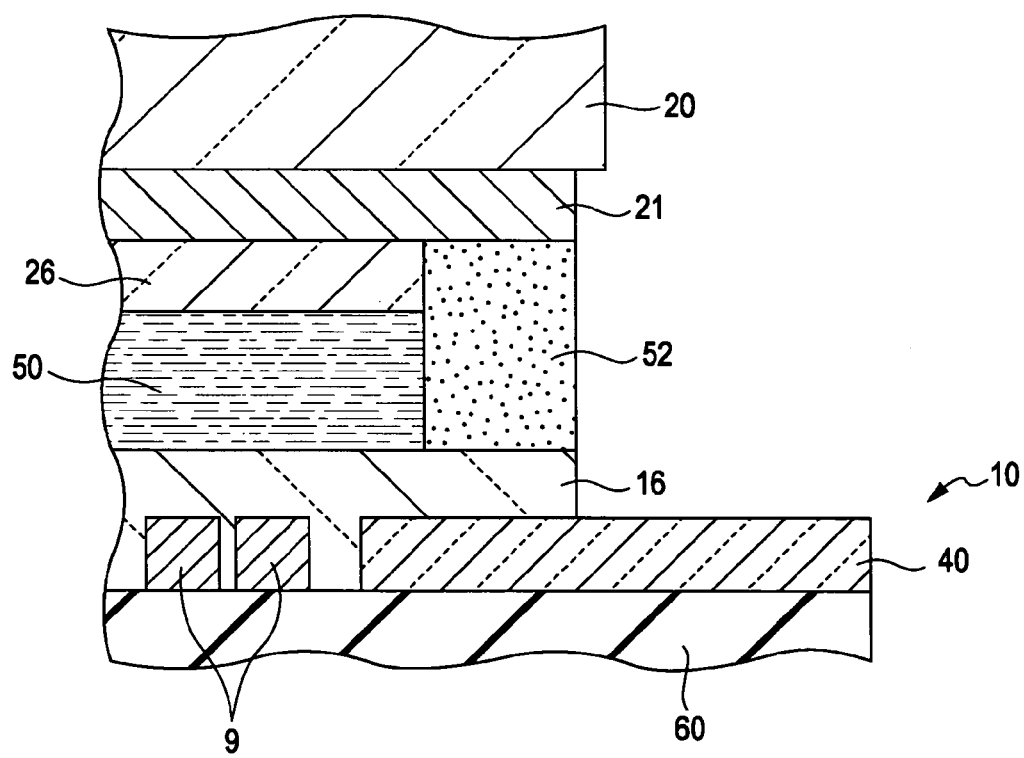
FIG. 7 is a partial sectional view of a liquid crystal display device, showing a modification of an externally exposed transparent conductive film.

Without being limited to the above configuration, as shown in FIGS. 5 and 6, the transparent conductive layer 40 may be formed on the entire surface of a region 42, except on the external connection terminals 102, from the outside of the region in which the pixel electrodes 9 are formed, that is, the outside of the display region 10h, to a circumferential end of the TFT substrate 10, between the insulating layer 60 and the alignment layer 16. In addition, when the transparent conductive layer 40 is formed not to contact the pixel electrodes 9, the transparent conductive layer 40 may be formed within the display region 10h.

With this configuration that the transparent conductive layer 40 is formed on substantially the entire surface of the TFT substrate 10, even when the liquid crystal display device 100 is used under high humidity conditions, since the alignment layer 16 is firmly adhered to the insulating layer 60 through the transparent conductive layer 40 over a wider range than the above embodiment, humidity can be more reliably prevented from penetrating from the outside of the liquid crystal display device 100 into the display region 10h through a gap between the insulating layer 60 and the alignment layer 16, thereby being prevented from mixing with the liquid crystals, which results in more reliable prevention of deterioration of picture quality due to display spots. As a result, the humidity resistance of the electro-optical device is considerably improved.

In addition, with the transparent conductive layer 40 formed in the wider range, as the adhesion between the alignment layer 16 and the insulating layer 60 is more increased, the alignment layer 16 can be more widely prevented from being peeled from the insulating layer 60 when the alignment layer 16 is rubbed, thereby more reliably preventing occurrence of rubbing spots such as stripes attached on the display region 10h due to dust particles of the alignment layer 16 from the insulating layer 60.

In addition, since the transparent conductive layer 40 is formed in the region 42 except the external connection terminals 102 and the pixel electrodes 9, that is, since the transparent conductive layer 40 is formed not to contact the external connection terminals 102 and the pixel electrodes 9, a short circuit occurs between the external connection terminals 102 or between the pixel electrodes 9, which may occur if the transparent conductive layer 40 contacts the external connection terminals 102 and the pixel electrodes 9.

In addition, like the above embodiment, since the transparent conductive layer 40 is in a floating state, the transparent conductive layer 40 may be exposed in a state where a portion of the alignment layer 16, which extends beyond the sealing material 52 toward the circumferential end of the TFT substrate 10, is removed, as shown in FIG. 7.

In addition, although the adhesion between the alignment layer 16 and the insulating layer 60 at the side of the TFT substrate 10 by the transparent conductive layer 40 has been illustrated in the above embodiment, if the opposite substrate 20 does not have a configuration that the counter electrode (made of ITO) 21 is formed on the entire surface of the opposite substrate 20, the transparent conductive layer 40 may be formed between the alignment layer 26 and a layer formed below the alignment layer 26 at the side of the opposite substrate 20 to improve the adhesion therebetween.

Second Embodiment

Next, a second embodiment of the invention will be described.

Figure 8:
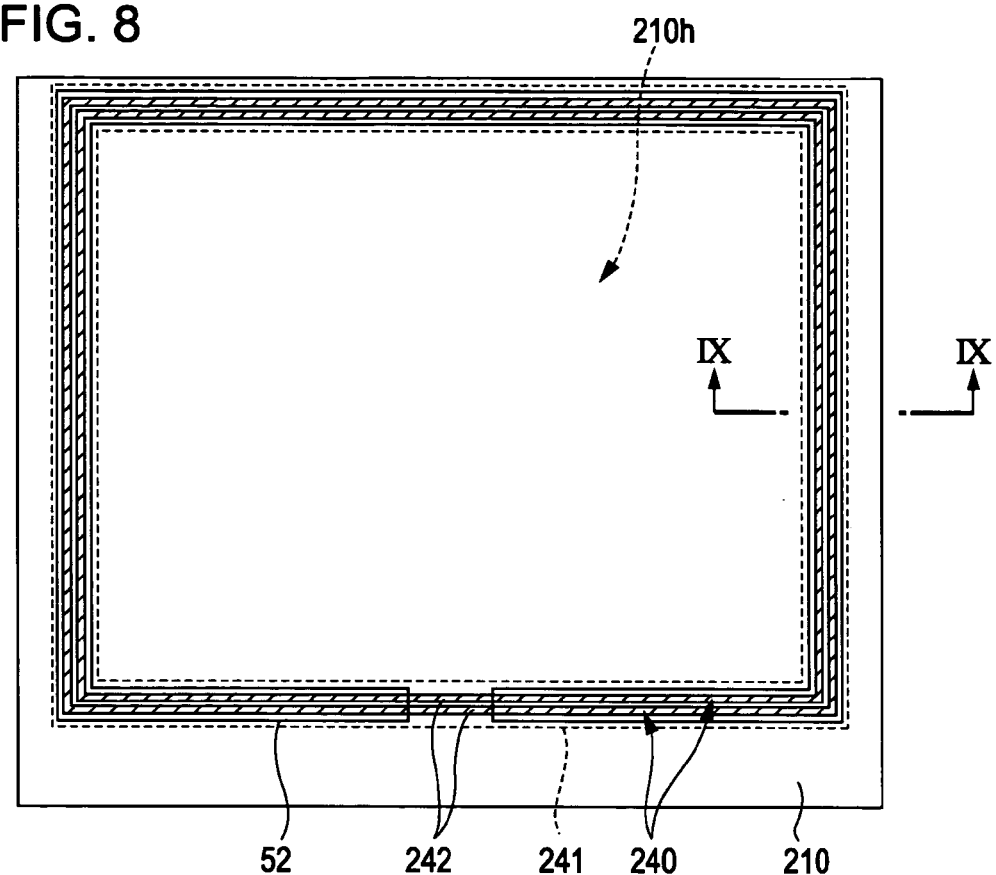
FIG. 8 is a front view showing a schematic configuration of a TFT substrate of a liquid crystal display device according to a second embodiment of the invention.
Figure 9:
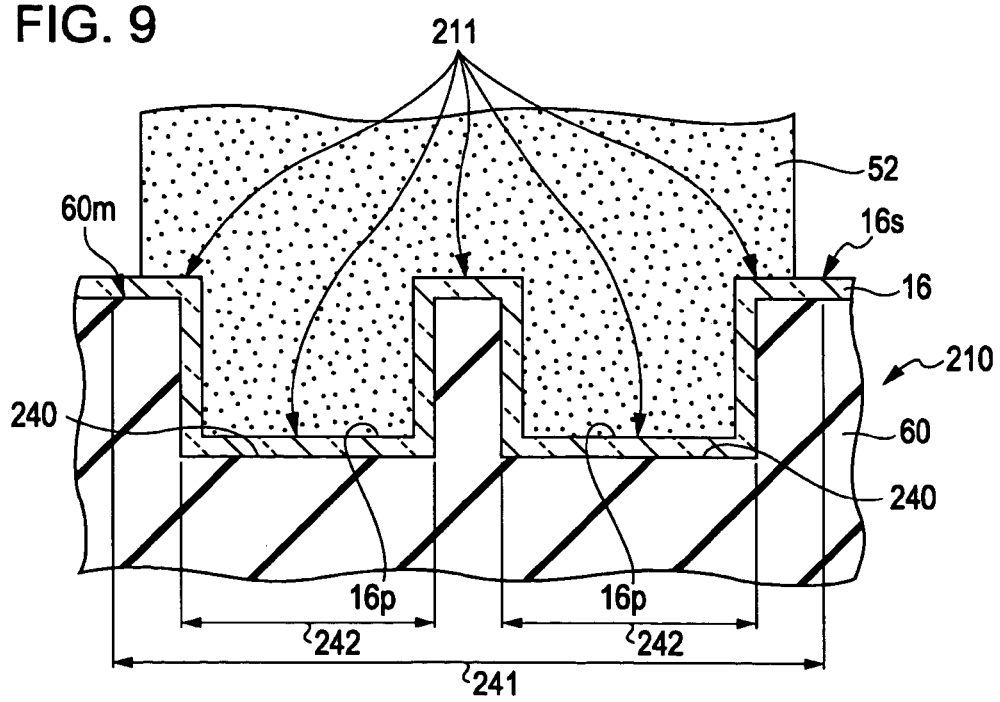
FIG. 9 is a partial sectional view taken along line IX-IX of FIG. 8.

FIG. 8 is a front view showing a schematic configuration of a TFT substrate of a liquid crystal display device according to a second embodiment of the invention, and FIG. 9 is a partial sectional view taken along line IX-IX of FIG. 8.

A liquid crystal display device according to the second embodiment is different from the liquid crystal display device 100 of the first embodiment as shown in FIGS. 1 to 7 in that the former has a configuration that the alignment layer 16 is firmly adhered to the insulating layer 60 without using the transparent conductive layer 40. Therefore, in the second embodiment, only this difference will be described, and the same elements as the first embodiment are denoted by the same reference numerals, explanation of which will be omitted.

In FIGS. 8 and 9, the light shield film 53, the data line driving circuit 101, the external connection terminals 102, the scan line driving circuits 103 and 104, the wiring lines 105, the upper and lower conductors 106, the upper and lower conductive terminals 107, the sealant 109 and the like are omitted for clarity of the figure.

As shown in FIG. 9, a concave groove 240 is formed in a region covering at least the sealing material 52 of a surface 60m of contact of the insulating layer 60, which is formed immediately below the alignment layer 16 of a TFT substrate 210 as a first substrate, with the alignment layer 16, that is, a groove forming region 242 within a region 241 covering a lower portion of the sealing material 52 of FIG. 9. In addition, the alignment layer 16 is formed on the surface 60m of the insulating layer 60, and the sealing material 52 is formed on a surface 16s of the alignment layer 16 in the region 241.

When the sealing material 52 is circumferentially applied, as shown in FIG. 8, each of a plurality (two in this embodiment) of concave grooves 240 formed in the groove forming region 242 within the region 241 has a closed loop shape along the sealing material 52 to surround a display region 210h as an effective pixel region. A single concave groove 240 may be formed.

With this configuration, a concave groove 16p is formed along the concave groove 240 in a portion of the alignment layer 16, which is formed on the concave groove 240, as shown in FIG. 9. That is, a surface 211 of contact of the TFT substrate 210 with the sealing material 52 has an uneven section. Accordingly, the adhesion between the insulating layer 60 and the alignment layer 16 is increased by the concave groove 240.

Figure 10:
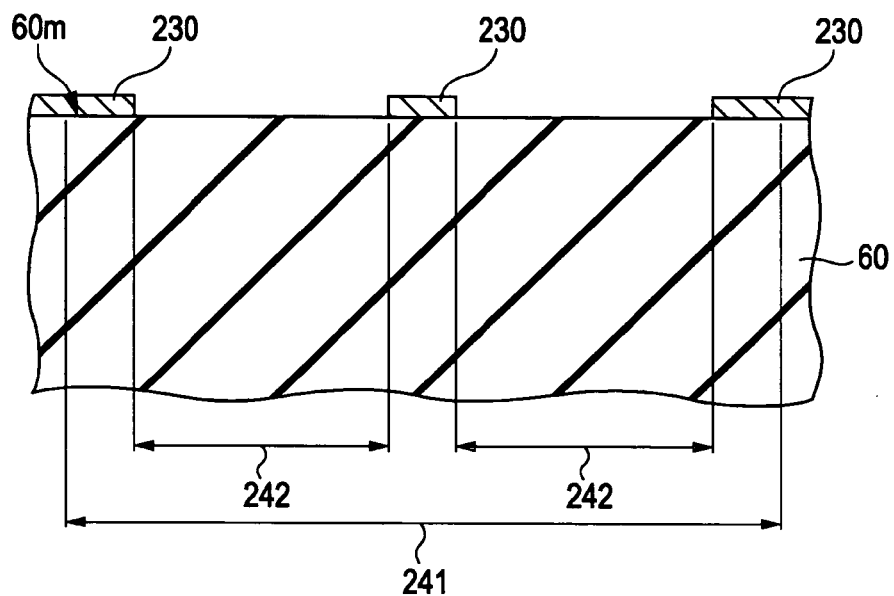
FIG. 10 is a sectional view illustrating a process of forming a mask in the outside of a groove forming region on an insulating layer.
Figure 12:
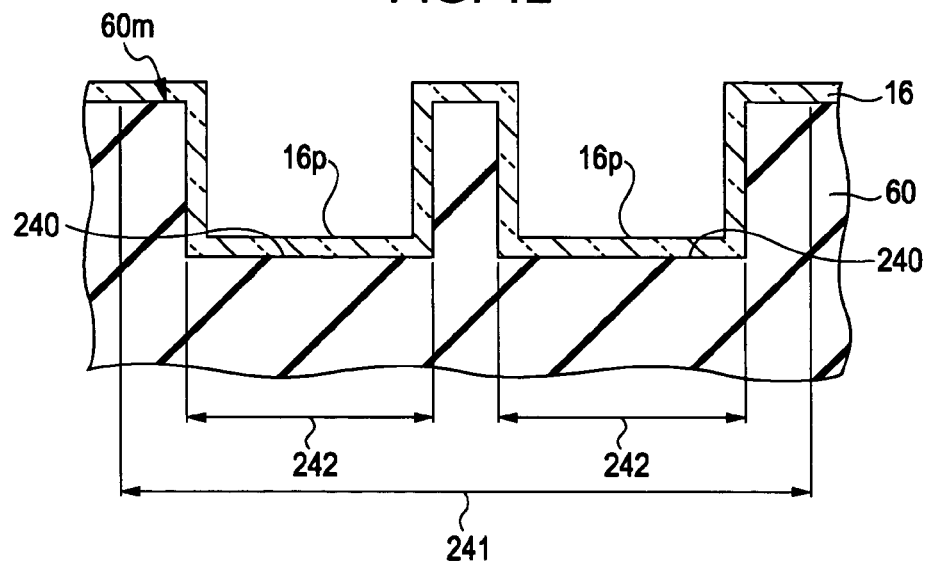
FIG. 12 is a sectional view illustrating a process of forming an alignment layer on the insulating layer of FIG. 11.
Figure 13:
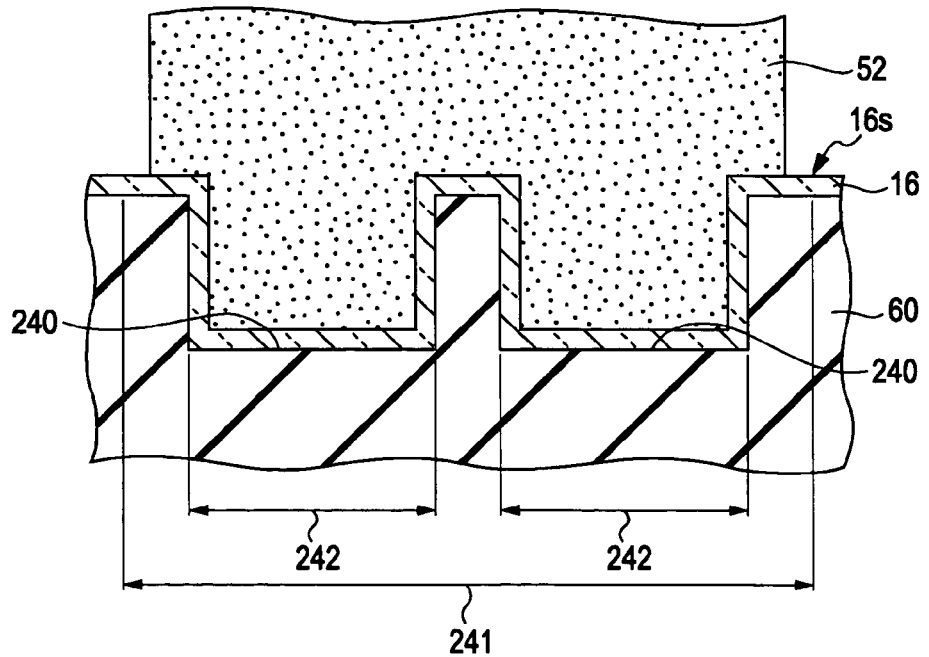
FIG. 13 is a sectional view illustrating a process of forming a sealing material on the alignment layer of FIG. 12 in a region covered with the sealing material.
Figure 14:
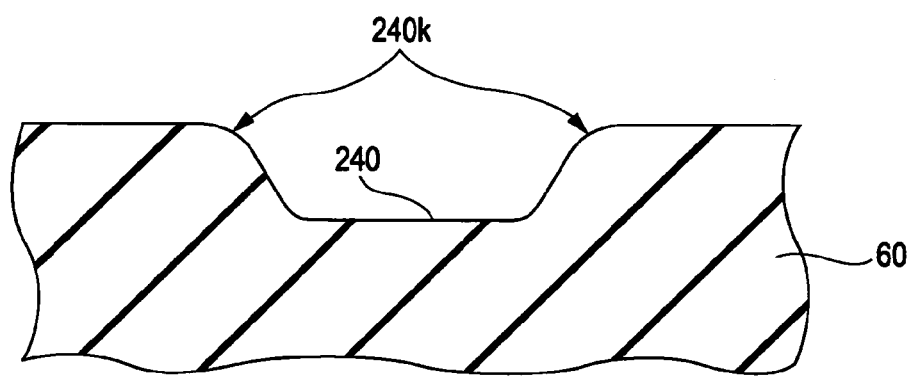
FIG. 14 is a sectional view showing a shape of a concave groove formed by wet etching.

Next, processes from the above-described groove forming process to a sealing material forming process will be described with reference to FIGS. 10 to 14. FIG. 10 is a sectional view illustrating a process of forming a mask in the outside of a groove forming region on an insulating layer, FIG. 11 is a sectional view illustrating a process of forming concave grooves in the outside of the groove forming region on the insulating layer of FIG. 10, FIG. 12 is a sectional view illustrating a process of forming an alignment layer on the insulating layer of FIG. 11, FIG. 13 is a sectional view illustrating a process of forming a sealing material on the alignment layer of FIG. 12 in a region covered with the sealing material, and FIG. 14 is a sectional view showing a shape of a concave groove formed by wet etching.

First, on the insulating layer 60 stacked on the TFT substrate 10 formed of a quartz substrate, a glass substrate, a silicon substrate or the like, a mask 230 is formed in a portion except the groove forming region 242 of the surface 60m of contact of the insulating layer 60 with the alignment layer 16, as shown in FIG. 10. The groove forming region 242 is located within the region 241 covering the sealing material 52 which will be formed later.

Figure 11:
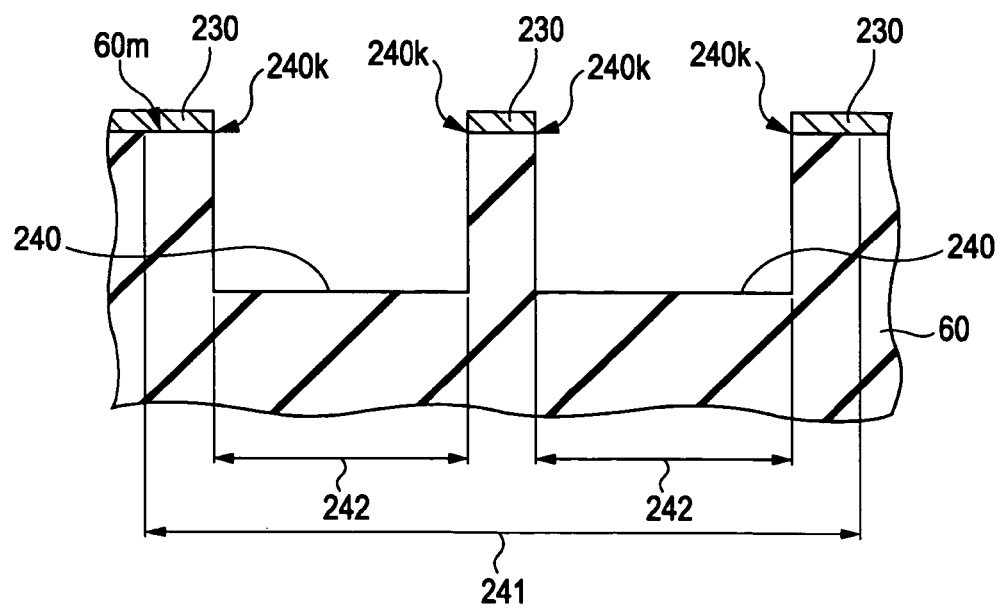
FIG. 11 is a sectional view illustrating a process of forming concave grooves in the outside of the groove forming region on the insulating layer of FIG. 10.

Subsequently, as shown in FIG. 11, for example, two concave grooves 240 are circumferentially formed in a closed loop shape as shown in FIG. 8 in the groove forming region 242 by, for example, dry etching. The concave grooves 240 formed by the dry etching is formed such that an opening edge 240k of the concave groove 240, which is formed by the surface 60m of contact of the insulating layer 60, which is formed on the TFT substrate 10 in this process, with the alignment layer 16 and the concave groove 240 has a right-angled section.

The concave grooves 240 may be formed by wet etching. The concave grooves 240 formed by the wet etching may be formed such that the opening edge 240k of the concave groove 240, which is formed by the surface 60m of contact of the insulating layer 60, which is formed on the TFT substrate 10 in this process, with the alignment layer 16 and the concave groove 240 is curved, or has an obtuse-angled section, as shown in FIG. 14.

After the concave groove 240 is formed in the groove forming region 242 of the insulating layer 60, the mask 230 is removed, and the alignment layer 16 is formed on the surface 60m of the insulating layer 60, as shown in FIG. 12. The alignment layer 16 is also formed on the entire surface of the substrate, that is, the pixel electrodes 9 of the display region 10h. In addition, the concave groove 16p is also formed along the concave groove 240 in a portion of the alignment layer 16, which is formed on the groove forming region 242.

Finally, as shown in FIG. 13, the sealing material 52 is circumferentially formed on a surface 16s of the alignment layer 16 in the region 241.

In this manner, in this embodiment, two concave grooves 240 are circumferentially formed in the closed loop shape along the sealing material 52 in the region covering at least the sealing material 52 of the surface 60m of contact of the insulating layer 60 with the alignment layer 16, that is, the groove forming region 242 within the region 241 covering the lower portion of the sealing material 52 of FIG. 9.

With this configuration, even when the liquid crystal display device 100 is used under high humidity conditions, since a path of penetration of humidity is further prolonged by the concave groove 240, compared to a case where there is no concave groove, humidity can be reliably prevented from penetrating from the outside of the liquid crystal display device 100 into the display region 10h of the TFT substrate 10, which is surrounded by the sealing material 52, through a gap between the insulating layer 60 and the alignment layer 16 formed on the insulating layer 60, thereby being prevented from mixing into the liquid crystals, which results in reliable prevention of deterioration of picture quality due to display spots. As a result, humidity resistance of the electro-optical device is improved.

In addition, as the adhesion between the insulating layer 60 and the alignment layer 16 is further increased by the concave groove 240, compared to a case where the surface 60m of the insulating layer 60 is flat, the alignment layer 16 can be prevented from being peeled from the insulating layer 60 when the alignment layer 16 is rubbed, thereby reliably preventing occurrence of rubbing spots such as stripes attached on the display region 10h due to dusts of the alignment layer 16 peeled from the insulating layer 60.

Figure 15:
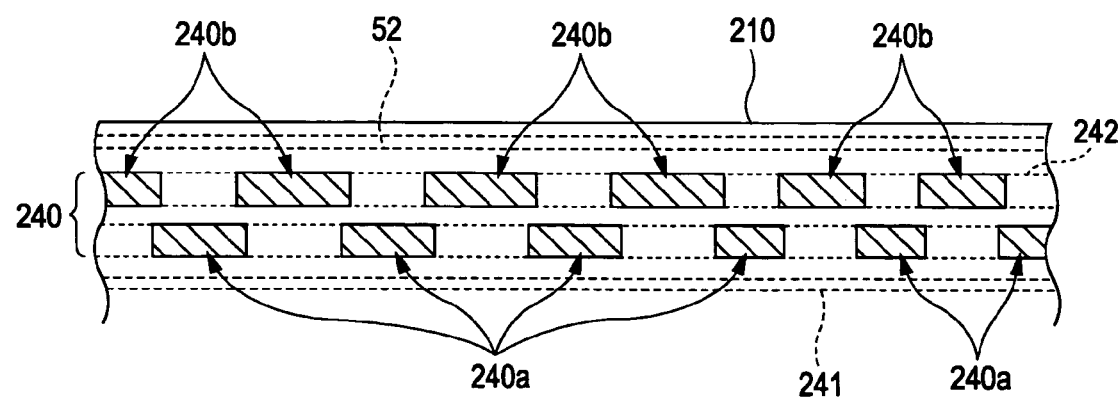
FIG. 15 is a partial plan view of the TFT substrate, showing a modification of a plane shape of a concave groove of FIG. 8.

Hereinafter, a modification of the second embodiment will be described. FIG. 15 is a partial plan view of the TFT substrate, showing a modification of a plane shape of the concave groove of FIG. 8. Although it has been illustrated in the second embodiment that the concave groove 240 is circumferentially formed along the sealing material in the closed loop shape, the concave groove 240 may not be formed in the closed loop shape as long as it is circumferentially formed.

Specifically, as shown in FIG. 15, a plurality of concave grooves 240a are circumferentially formed at predetermined intervals in the groove forming region 242 within the region 241 covering the sealing material 52 of the insulating layer 60, and a plurality of concave grooves 240b are circumferentially formed at predetermined intervals in the circumference of the concave grooves 240a, with the concave grooves 240b being out of phase with the concave grooves 240a in such a manner that the concave grooves 240b block gaps between the concave grooves 240a.

That is, the concave groove 240 constituted by the two circumferential concave grooves 240a and 240b is formed in a zigzag pattern in plane. In this case, the concave groove 240 is not limited to two in number, but may be more in number as long as outer concave grooves block gaps between inner concave grooves.

With the concave groove configured as above, the same effect as the second embodiment can be obtained.

In addition, although the adhesion between the alignment layer 16 and the insulating layer 60 at the side of the TFT substrate 10 by the concave groove 240 has been illustrated in the second embodiment, the concave groove 240 may be formed between the alignment layer 26 and a layer formed below the alignment layer 26 at the side of the opposite substrate 20 to improve the adhesion therebetween.

Third Embodiment

Next, a third embodiment of the invention will be described.

Figure 16:
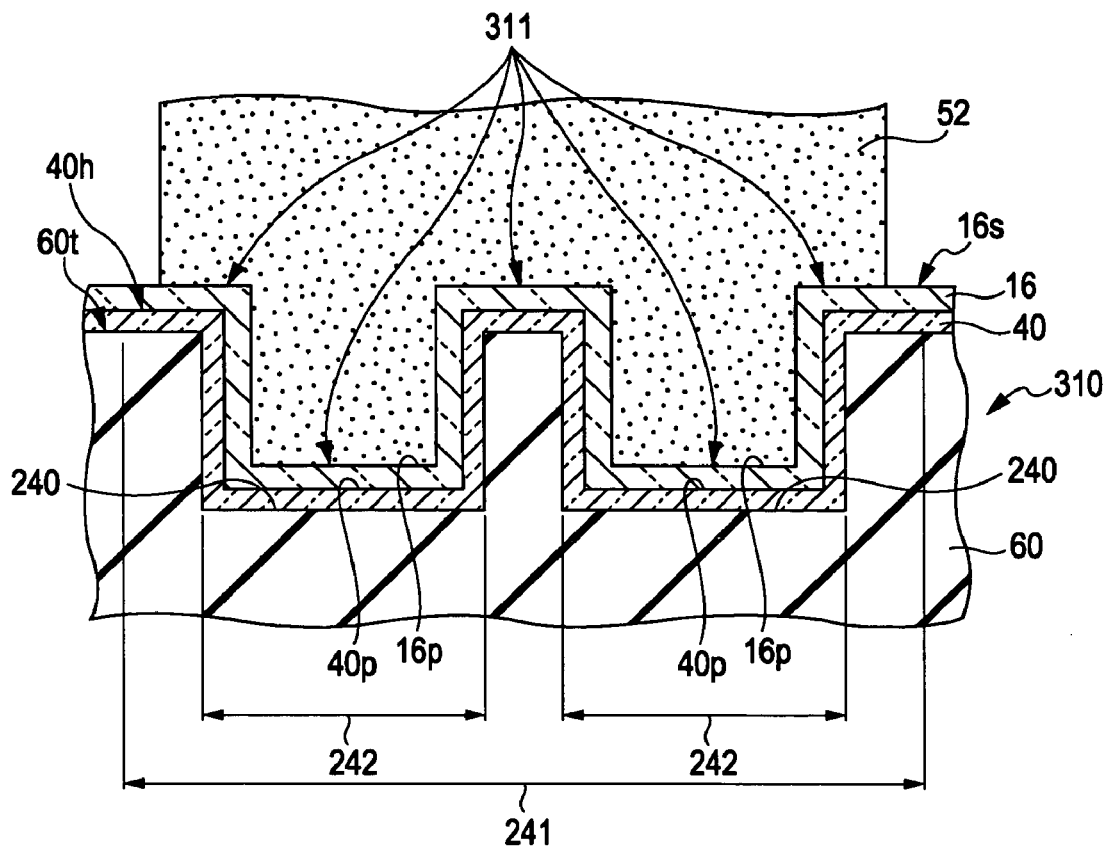
FIG. 16 is a partial sectional view of a TFT substrate of a liquid crystal display device according to a third embodiment of the invention.

FIG. 16 is a partial sectional view of a TFT substrate of a liquid crystal display device according to a third embodiment of the invention. A liquid crystal display device according to the third embodiment is different from the liquid crystal display device of the first embodiment as shown in FIGS. 1 to 7 and the liquid crystal display device of the second embodiment as shown in FIGS. 8 and 9 in that the former has a configuration that the alignment layer 16 is firmly adhered to the insulating layer 60 using a transparent conductive layer and a concave groove. Therefore, in the third embodiment, only this difference will be described, and the same elements as the first and second embodiments are denoted by the same reference numerals, explanation of which will be omitted.

As shown in FIG. 16, the transparent conductive layer 40 is formed on a surface 60t of the insulating layer 60 of a TFT substrate 310 as a first substrate, the alignment layer 16 is formed on a surface 40h of the transparent conductive layer 40, and the sealing material 52 is formed on a surface 16s of the alignment layer 16 in the region 241.

The transparent conductive layer 40 is formed on the surface 60t of the insulating layer 60 in the region 241 covering at least the sealing material 52, as in the first embodiment. In this case, the transparent conductive layer 40 is in a floating state.

When the sealing material 52 is circumferentially applied, each of a plurality (two in the third embodiment) of concave grooves 240 formed in the groove forming region 242 within the region 241 of the insulating layer 60 has a closed loop shape along the sealing material 52 to surround the effective pixel region 210h, as in the second embodiment.

In this case, a single concave groove 240 may be formed. In addition, the concave groove 240 is not limited to the closed loop shape, but may have a zigzag pattern, as shown in FIG. 15.

With this configuration, a concave groove 40p is formed along the concave groove 240 on the transparent conductive layer 40 formed on the concave groove 240. In addition, a concave groove 16p is formed along the concave groove 240 on the alignment layer 16 formed on the transparent conductive layer 40.

That is, a surface 311 of contact of the TFT substrate 210 with the sealing material 52 has an uneven section. Accordingly, the adhesion between the insulating layer 60 and the alignment layer 16 is increased in the region 241 by not only the concave groove 240 but also the transparent conductive layer 40 firmly adhered to the alignment layer 16 and the insulating layer 60.

Next, processes from the above-described concave groove forming process to a sealing material forming process will be described with reference to FIGS. 10 and 11 related to the second embodiment and FIGS. 17 to 19.

Figure 17:
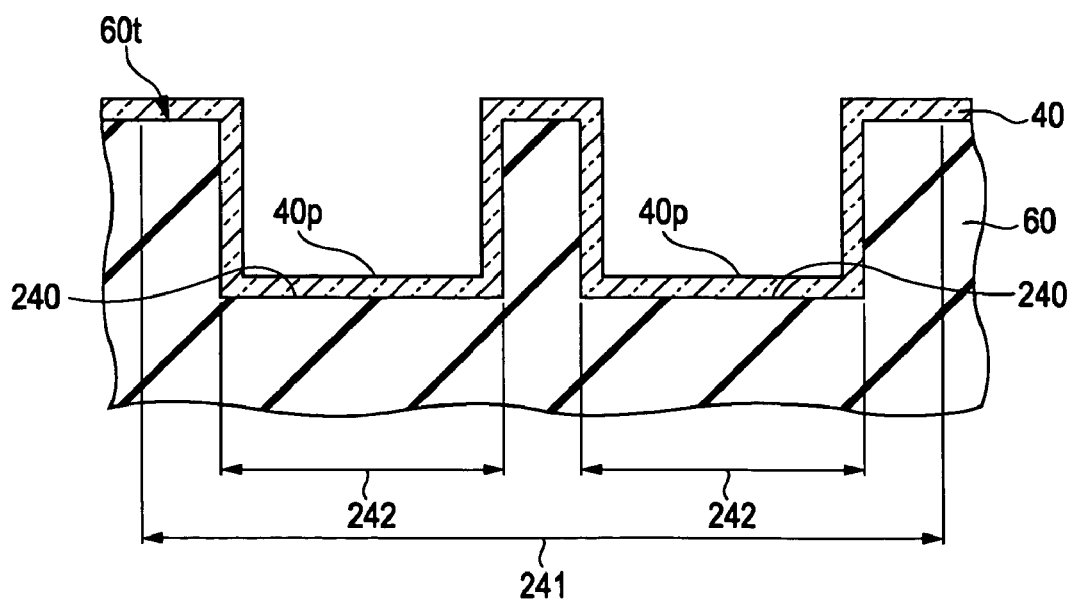
FIG. 17 is a sectional view illustrating a process of forming a transparent conductive film on the insulating layer of FIG. 11.
Figure 18:
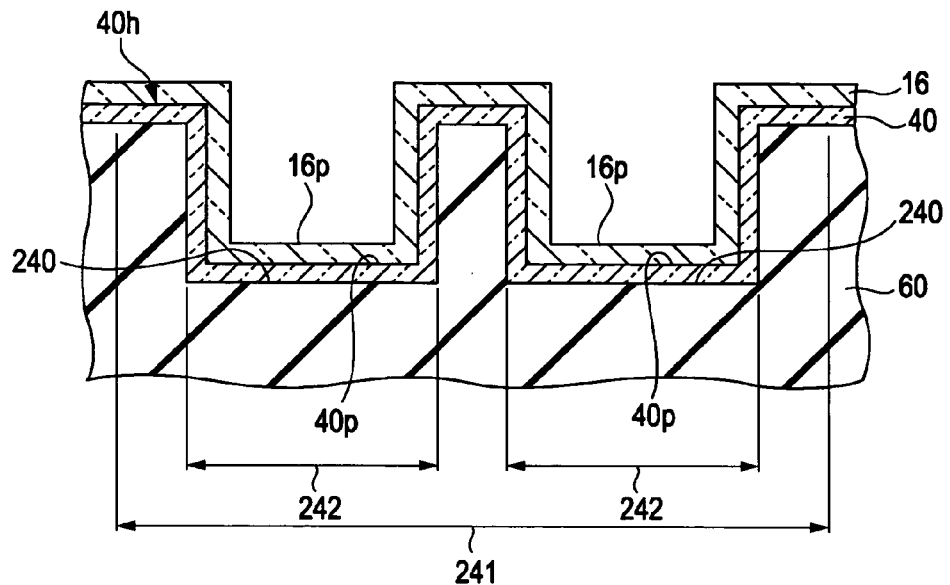
FIG. 18 is a sectional view illustrating a process of forming an alignment layer on the transparent conductive film of FIG. 17.
Figure 19:
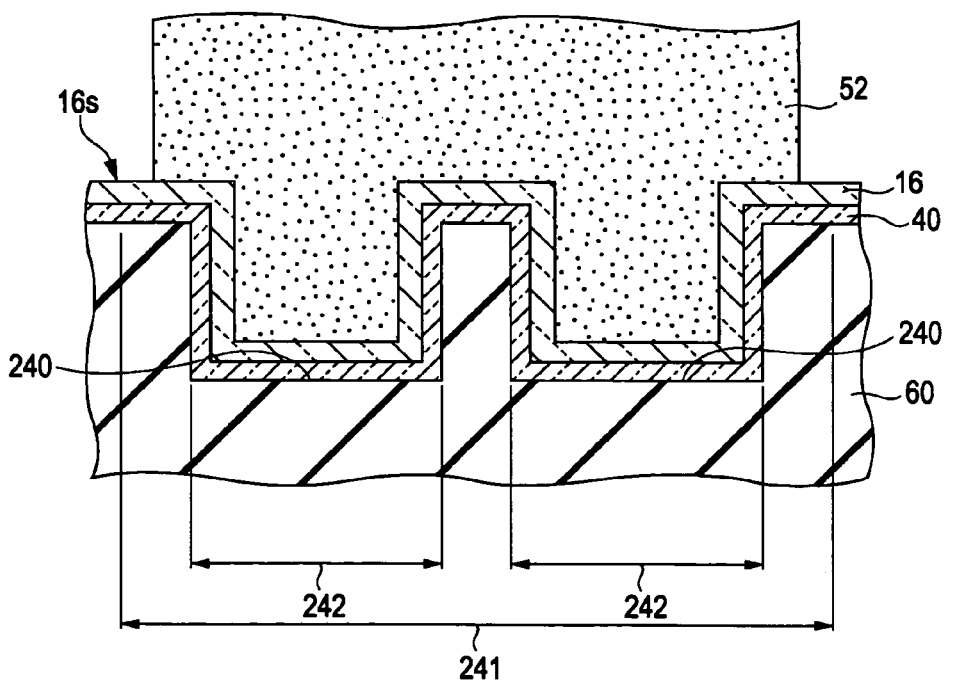
FIG. 19 is a sectional view illustrating a process of forming a sealing material on the alignment layer of FIG. 18 in a region covered with the sealing material.

FIG. 17 is a sectional view illustrating a process of forming a transparent conductive film on the insulating layer of FIG. 11, FIG. 18 is a sectional view illustrating a process of forming an alignment layer on the transparent conductive film of FIG. 17, and FIG. 19 is a sectional view illustrating a process of forming a sealing material on the alignment layer of FIG. 18 in a region covered with the sealing material.

First, on the insulating layer 60, the mask 230 is formed in a portion except the groove forming region 242 of the surface 60t of contact of the insulating layer 60 with the alignment layer 16, as shown in FIG. 10. Subsequently, as shown in FIG. 11, for example, two concave grooves 240 are circumferentially formed in a closed loop shape as shown in FIG. 8 in the groove forming region 242 by, for example, dry etching.

After the concave groove 240 is formed in the groove forming region 242 of the insulating layer 60, the mask 230 is removed, and the transparent conductive layer 40 is formed on the insulating layer 60, as shown in FIG. 17. The transparent conductive layer 40 is formed on the region 241 covering at least the sealing material 52 an in which the concave groove 240 is formed in the insulating layer 60, as in the first embodiment. At this time, the concave groove 40p is formed along the concave groove 240 in a portion of the transparent conductive layer 40, which is formed on the groove forming region 242.

In this case, as in the first embodiment, the transparent conductive layer 40 may be formed on the entire surface of a region, except the external connection terminals 102, from the outside of the region in which the pixel electrodes 9 are formed, that is, the outside of the display region, to a circumferential end of the TFT substrate, as shown in FIG. 5.

Subsequently, as shown in FIG. 18, the alignment layer 16 is formed on the surface 40h of the transparent conductive layer 40. The alignment layer 16 is also formed on the entire surface of the substrate, that is, on the pixel electrodes 9 of the display region 10h. In addition, the concave groove 16p is formed along the concave groove 240 in a portion of the alignment layer 16, which is formed on the groove forming region 242.

Finally, as shown in FIG. 19, the sealing material 52 is circumferentially formed on the surface 16s of the alignment layer 16 in the region 241.

In this manner, in this embodiment, two concave grooves 240 are circumferentially formed in the closed loop shape along the sealing material 52 in the groove forming region 242 within the region 241 covering at least the sealing material 52 at the side of the surface 60t of the insulating layer 60. In addition, the transparent conductive 40 is formed between the alignment layer 16 covering the sealing material 52, and the insulating layer 60.

With this configuration, even when the liquid crystal display device 100 is used under high humidity conditions, since the insulating layer 60 is firmly adhered to the alignment layer 16, with the transparent conductive layer 40 disposed therebetween, and a path of penetration of humidity is further prolonged by the concave groove 240, compared to a case where there is no concave groove, humidity can be reliably prevented from penetrating from the outside of the liquid crystal display device 100 into the display region 10h of the TFT substrate 10, which is surrounded by the sealing material 52, through a gap between the insulating layer 60 and the alignment layer 16, thereby being prevented from mixing into the liquid crystals, which results in more reliable prevention of deterioration of picture quality due to display spots. As a result, humidity resistance of the electro-optical device is improved.

In addition, as the adhesion between the insulating layer 60 and the alignment layer 16 is further increased by the transparent conductive layer 40 and the concave groove 240, the alignment layer 16 can be prevented from being peeled from the insulating layer 60 when the alignment layer 16 is rubbed, thereby more reliably preventing occurrence of rubbing spots such as stripes attached on the display region 10h due to dusts of the alignment layer 16 peeled from the insulating layer 60.

In addition, although the adhesion between the alignment layer 16 and the insulating layer 60 at the side of the TFT substrate 10 by the transparent conductive layer 40 has been illustrated in the third embodiment, if the opposite substrate 20 does not have a configuration that the counter electrode (made of ITO) 21 is formed on the entire surface of the opposite substrate 20, the transparent conductive layer 40 may be formed between the alignment layer 26 and a layer formed below the alignment layer 26 at the side of the opposite substrate 20 to improve the adhesion therebetween. In this case, the concave groove 240 may be formed at the side of the opposite substrate 20.

Fourth Embodiment

Next, a fourth embodiment of the invention will be described.

Figure 20:
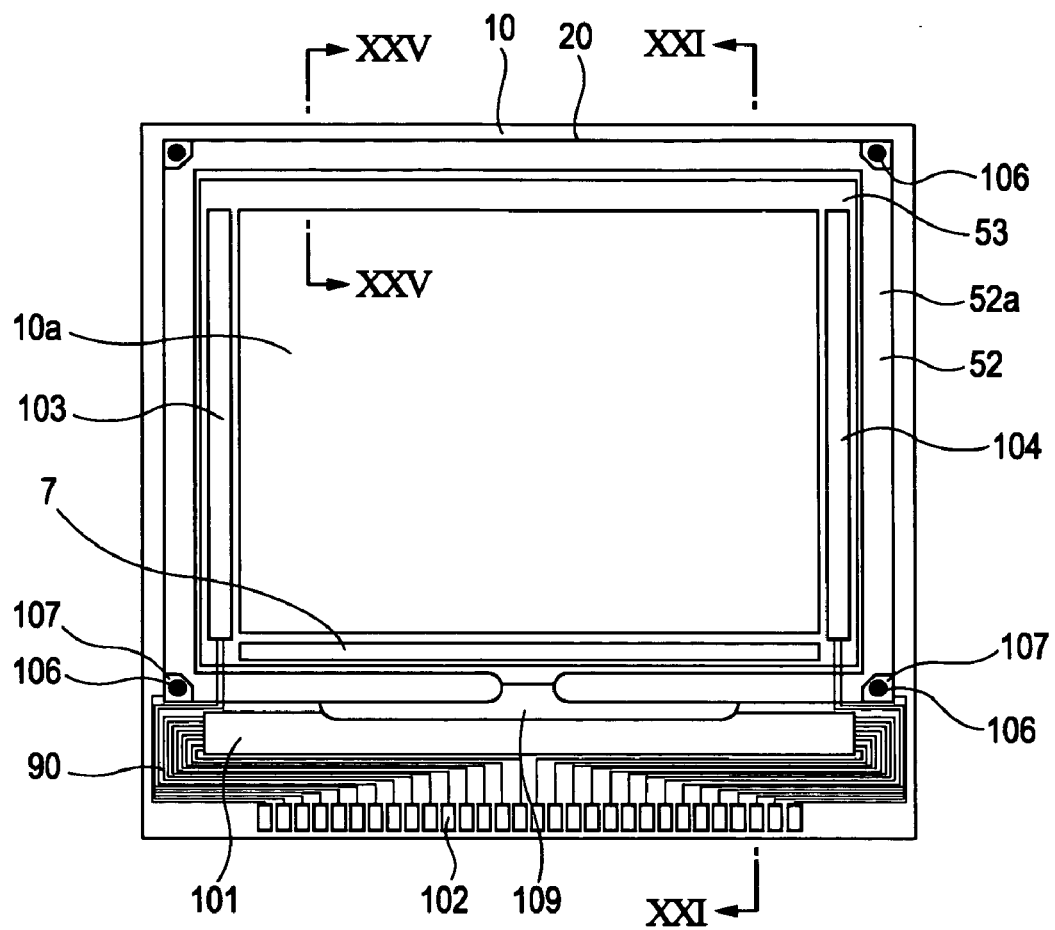
FIG. 20 is a plan view showing an entire configuration of a liquid crystal display device according to a fourth embodiment of the invention.

First, the entire configuration of a liquid crystal display device according a fourth embodiment of the invention will be described with reference to FIGS. 20 and 21. FIG. 20 is a plan view showing an entire configuration of a liquid crystal display device according to a fourth embodiment of the invention, and FIG. 21 is a sectional view taken along line H-H' of FIG. 20.

Figure 21:
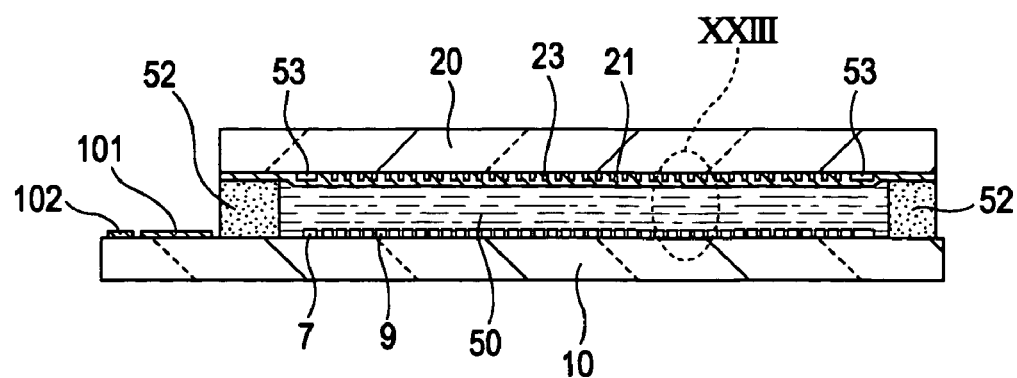
FIG. 21 is a sectional view taken along line H-H' of FIG. 20.

In FIGS. 20 and 21, the liquid crystal display device according to the fourth embodiment includes the TFT substrate 10 and the opposite substrate 20 facing the TFT substrate 10. The TFT substrate 10 is provided as one example of a "first substrate" related to the invention, and the opposite substrate 20 is provided as one example of a "second substrate" related to the invention. TFT substrate 10 is formed of, for example, a quartz substrate, a glass substrate, a silicon substrate or the like, and the opposite substrate 20 is formed of, for example, a quartz substrate, a glass substrate or the like. The TFT substrate 10 and the opposite substrate 20 are bonded together by the sealing material 52 provided in a seal region 52a located near an image display region 10a as one example of a "display region" related to the invention, and liquid crystals 50 injected between the TFT substrate 10 and the opposite substrate 20 are sealed by the sealing material and the sealant 109.

As shown in FIG. 20, the light shield film 53 defining a frame region of the image display region 10a is provided at the side of the opposite substrate 20 in parallel to an inner side of the seal region 52a in which the sealing material 52 is arranged. In a peripheral region, the data line driving circuit 101 and the external circuit connection terminals 102 are provided along one side of the TFT substrate 10 in a region located in the outside of the seal region 52a in which the sealing material 52 is arranged. A sampling circuit 7 is provided to be covered by the light shield film 53 in the inside of the seal region 52a along this one side. In addition, the scan line driving circuits 103 and 104 are provided to be covered by the light shield film 53 in the inside of the seal region along two sides adjacent to the one side. In addition, on the TFT substrate 10, the upper and lower conductive terminals 107 to interconnect both substrates using the upper and lower conductors 106 are arranged in a region in the opposite of four corners of the opposite substrate 20. The upper and lower conductive terminals 107 allow electrical conduction between the TFT substrate 10 and the opposite substrate 20.

On the TFT substrate 10 are provided wiring lines 90 for interconnecting the external connection terminals 102, the data line driving circuit 101, the scan line driving circuits 103 and 104, the upper and lower conductive terminals 107, etc.

As shown in FIG. 21, on the TFT substrate 10 is formed a stacked structure where TFTs for pixel switches as driving elements, wiring lines such as scan lines and data lines, etc. are arranged. In the image display region 10a, the pixel electrodes 9 formed of an ITO film as one example of a "transparent conductive layer" related to the invention, are formed on a layer above the TFTs for pixel switches, the wiring lines such as scan lines and data lines, etc. An alignment layer is formed on the pixel electrodes 9. On the other hand, a light shield film 23 is formed on the opposite substrate 20 facing the TFT substrate 10. In addition, on the light shield film 23 is formed a counter electrode 21, which is formed of the same ITO film as the pixel electrodes 9, in the opposite to the pixel electrodes 9. An alignment layer is formed on the counter electrode 21. In addition, the liquid crystals 50 include one kind of nematic liquid crystal or a mixture of two or more kinds of nematic liquid crystal, for example, and have a particular alignment state between the pair of alignment layers. In addition, although not shown, an optical thin film to be described later is formed immediately below the pixel electrodes 9 on the TFT substrate 10, and a seal low-side layer to be described later is formed in the seal region 52a on the TFT substrate 10.

In addition, although not shown, on the TFT substrate 10 may be formed a check circuit, a check pattern or the like to check quality or defects of the liquid crystal display device during manufacture or at the time of shipping, in addition to the data line driving circuit 101, the scan line driving circuits 103 and 104.

Figure 22:
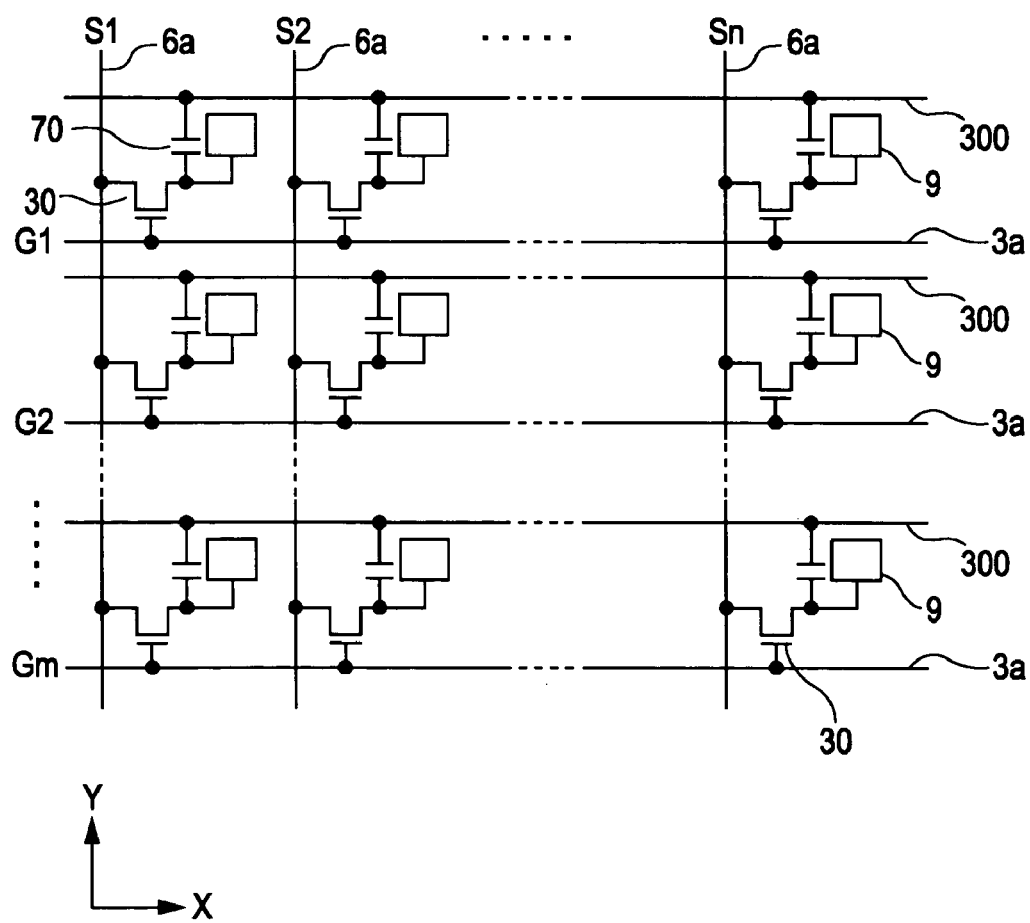
FIG. 22 is an equivalent circuit diagram of various elements in pixels of the liquid crystal display device according to the fourth embodiment of the invention.

Next, an electrical configuration of pixels of the liquid crystal display device according to the fourth embodiment will be described with reference to FIG. 22. FIG. 22 is an equivalent circuit diagram of various elements, wiring lines and the like in pixels which are arranged in the form of a matrix and form an image display region of a liquid crystal display device.

As shown in FIG. 22, in each of the plurality of pixels, which are arranged in the form of a matrix and form an image display region of a liquid crystal display device, a pixel electrode 9 and a TFT 30 to switch the pixel electrode 9 are formed and a data line 6a to which an image signal is supplied is electrically connected to a source of the TFT 30. The image signal S1, S2, . . . , Sn written in the data line 6a may be supplied in that sequence or for each group of adjacent data lines 6a.

In addition, a scan line 3a is electrically connected to a gate of the TFT 30, and a scan signal G1, G2, . . . , Gm is pulsatively applied to the scan line 3a at a predetermined timing in that sequence. The pixel electrode 9 is electrically connected to a drain of the TFT 30, and the image signal S1, S2, . . . , Sn, which is supplied from the data line 6a, is written at a predetermined timing by switching off the TFT 30 as the switching element for a preset period of time.

The image signal S1, S2, . . . , Sn of a predetermined level, which is written in the liquid crystals 50 (see FIG. 21) through the pixel electrode 9, is maintained between the pixel electrode 9 and the counter electrode formed on the opposite substrate for a preset period of time. The liquid crystals 50 modulate light to enable gray scale representation as alignment or order of liquid crystal molecules is varied by a level of voltage applied to the liquid crystals 50. In case of a normally white mode, transmittance of incident light is decreased depending on a voltage applied for each pixel. In case of a normally black mode, transmittance of incident light is increased depending on a voltage applied for each pixel. Accordingly, as a whole, light having a contrast depending on an image signal is emitted from the liquid crystal display device.

Here, in order to prevent a maintained image signal from leaking, a storage capacitor 70 is added in parallel to liquid crystal capacitance formed between the pixel electrode 9 and the counter electrode 21 (see FIG. 21). On electrode of the storage capacitor 70 is connected to the drain of the TFT 30 in parallel to the pixel electrode 9, and the other electrode is connected to a capacitive wiring line 300 at a fixed potential to have a static potential.

Figure 23:
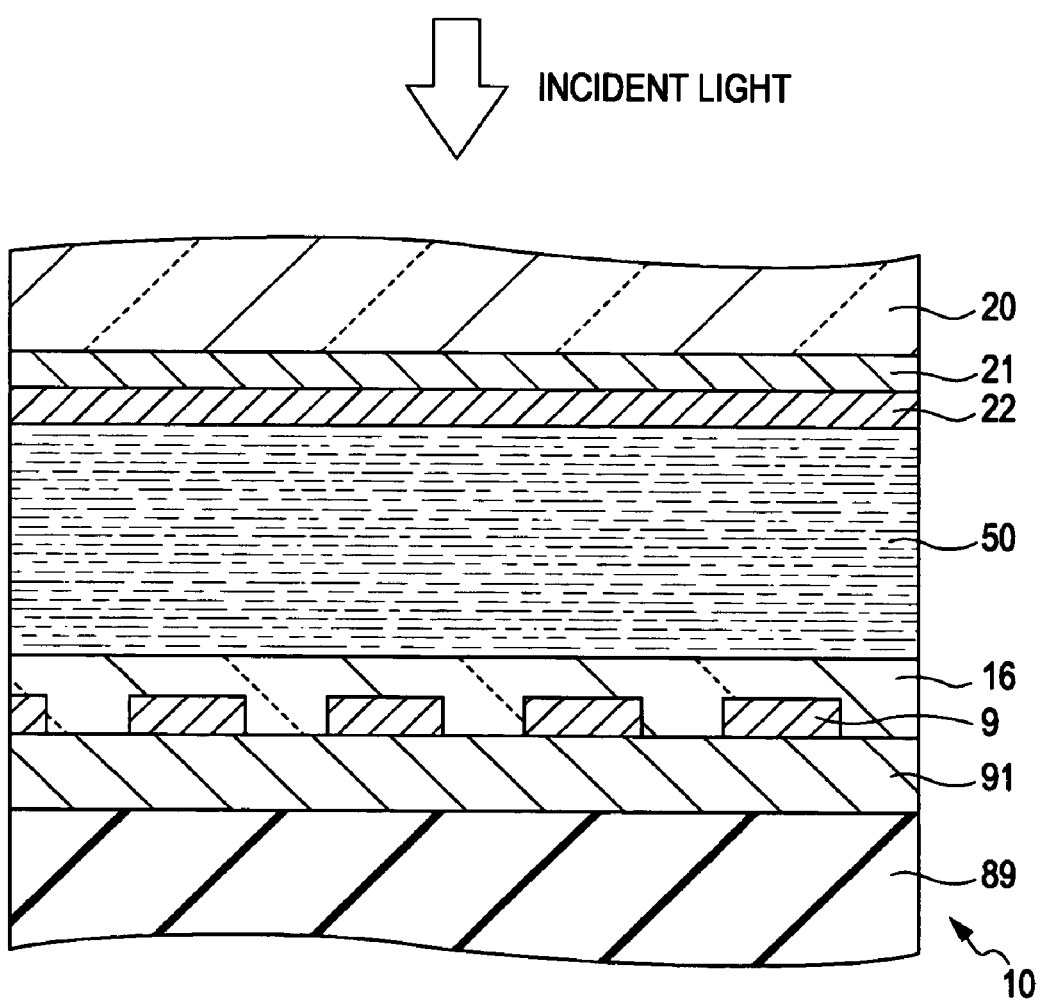
FIG. 23 is a partially enlarged sectional view of a portion C1 of FIG. 21.
Figure 24:
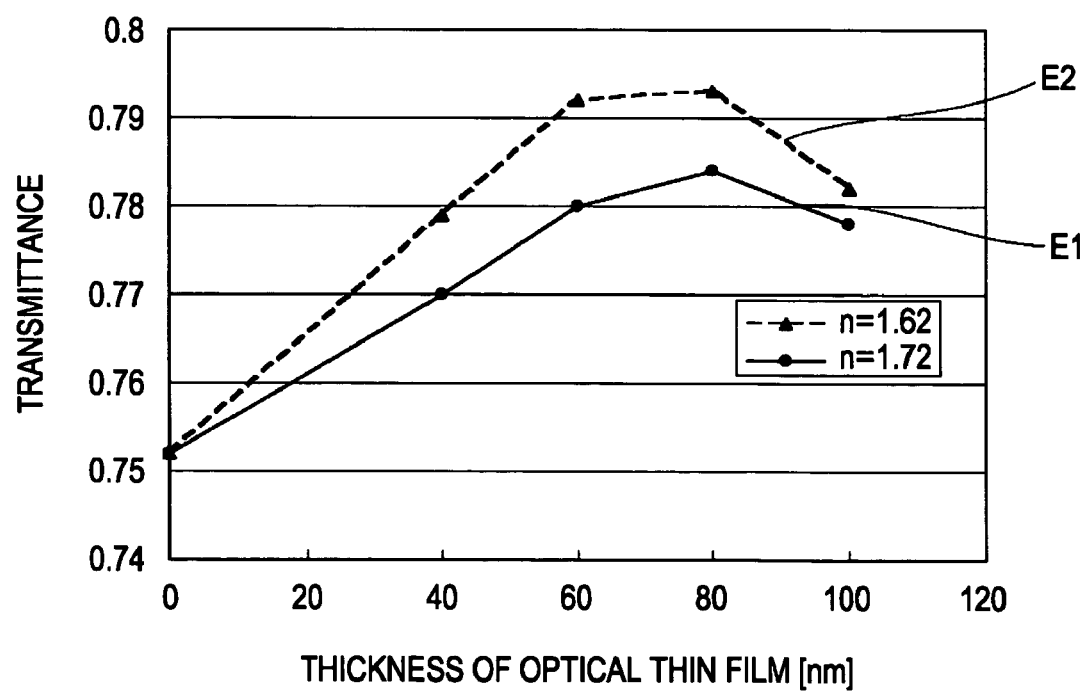
FIG. 24 is a graph showing a relation between thickness of an optical thin film and transmittance.

Next, an optical thin film according to the fourth embodiment will be described with reference to FIGS. 23 and 24. FIG. 23 is a partially enlarged sectional view of a portion C1 of FIG. 21, and FIG. 24 is a graph showing a relation between thickness of an optical thin film and transmittance. The light shield film 23 of FIG. 21 is not shown in FIG. 23. In FIG. 23, layers and members are scaled to a perceivable size.

As shown in FIG. 23, on the TFT substrate 10 are stacked the TFT 30 (not shown) and various layers (not shown) including the scan line 3a, the data line 6a, etc. In addition, an interlayer insulating layer 89 is formed on the TFT substrate 10. The interlayer insulating layer 89 is formed of non-silicate glass (NSG) or a silicon oxide film. In addition, the interlayer insulating layer 89 may be made of, for example, silicate glass, such as phosphosilicate glass (PSG), BSG, BPSG or the like, or silicon dioxide or the like. An optical thin film 91 to be described later and the pixel electrode 9 are stacked in order on the interlayer insulating layer 89, and an alignment layer 16 formed of a transparent organic film such as a polyimide film is formed on the pixel electrode 9. On the other hand, the counter electrode 21 is stacked on the opposite substrate 20, and an alignment layer 22 formed of a transparent organic film such as a polyimide film is formed on the counter electrode 21. The liquid crystals 50 have a particular alignment state between the pair of alignment layers 16 and 22. In addition, the alignment layers 16 and 22 may be formed of an inorganic film such as silica (SiO2), instead of the organic film such as a polyimide film. That is, the alignment layers 16 and 22 may be either an organic alignment layer or an inorganic alignment layer made of inorganic material.

As shown in FIG. 23, in this embodiment, the optical thin film 91 is particularly stacked between the interlayer insulating layer 89 and the pixel electrode 9. That is, the interlayer insulating layer 89, the optical thin film 91 and the pixel electrode 9 are stacked in order on the TFT substrate 10. The optical thin film 91 is formed on the entire surface of the TFT substrate 10. In addition, in this embodiment, particularly, the optical thin film 91 has a middle refractive index between a refractive index of the interlayer insulating layer 89 and a refractive index of the pixel electrode 9. That is, while the refractive index of the interlayer insulating layer 89 formed of an NSG film (or a silicon oxide film) is about 1.4 and the refractive index of the pixel electrode 9 formed of an ITO film is about 2.0, the refractive index of the optical thin film 91 falls within a range of 1.6 to 1.8. The optical thin film 91 is formed of, for example, a silicon nitride film (SiN), a silicon oxynitride film (SiON) or the like. Accordingly, the optical thin film 91 can increase transmittance when light incident into the pixel electrode 9 via, for example, the opposite substrate 20 and the liquid crystals 50 emits into the interlayer insulating layer 89 through the pixel electrode 9. In other words, if the pixel electrode 9 is provided on the interlayer insulating layer 89 with no measure, there may occur a relatively large interfacial reflection at an interface between the pixel electrode 9 and the interlayer insulating layer 89 due to a relatively large difference (about 0.6) in refractive index between the interlayer insulating layer 89 and the pixel electrode 9. According to this embodiment, this interfacial reflection can be reduced by the optical thin film 91 having a middle refractive index (i.e., a refractive index having a range of 1.6 to 1.8). In other words, since a difference (about 0.2 to 0.4) in refractive index between the pixel electrode 9 and the optical thin film 91 and a difference (about 0.2 to 0.4) in refractive index between the optical thin film 91 and the interlayer insulating layer 89 are smaller than the difference (about 0.6) in refractive index between the pixel electrode 9 and the interlayer insulating layer 89, the amount of interfacial reflection at an interface between the pixel electrode 9 and the optical thin film 91 and the amount of interfacial reflection at an interface between the optical thin film 91 and the interlayer insulating layer 89 are less than the amount of interfacial reflection at the interface between the pixel electrode 9 and the interlayer insulating layer 89. Also, the sum of the amount of interfacial reflection at an interface between the pixel electrode 9 and the optical thin film 91 and the amount of interfacial reflection at an interface between the optical thin film 91 and the interlayer insulating layer 89 is less than the amount of interfacial reflection at the interface between the pixel electrode 9 and the interlayer insulating layer 89. Accordingly, the optical thin film 91 can increase transmittance when light emits into the interlayer insulating layer 89 (i.e., into the TFT substrate 10) through the pixel electrode 9, for example.

FIG. 24 shows a relation between thickness of an optical thin film and transmittance when a simulation to vary the thickness of the optical thin film or a refractive index of the optical thin film for a stacked film having a stacked structure where the optical thin film formed of, for example, a silicon nitride film (SiN), a silicon oxynitride film (SiON) or the like, and an ITO film are stacked in order on a substrate formed of a silicon oxide film. Here, the transmittance refers to a ratio of the intensity of output light after incident light passes through the ITO film, the optical thin film and the substrate to the intensity of the incident.

In FIG. 24, data E1 represents a relation between the thickness of the optical thin film and the transmittance when the refractive index of the optical thin film is 1.72, and data E2 represents a relation between the thickness of the optical thin film and the transmittance when the refractive index of the optical thin film is 1.62. In addition, thickness of the ITO film is 80 nm, and transmittance when an optical thin film is not prepared (that is, when the thickness of the optical thin film is zero) is about 0.75.

As shown in FIG. 24, when the optical thin film having the refractive index of either 1.72 or 1.62 is used, the transmittance is relatively increased compared to a case where there exists no optical thin film. The transmittance is particularly increased when the thickness of the optical thin film falls within a range of 55 to 100 nm. Accordingly, it is preferable that an optical thin film having the refractive index of 1.6 to 1.8 and the thickness of 55 to 100 nm is provided between the substrate and the ITO film. With this configuration, it is possible to increase the transmittance effectively.

Figure 25:
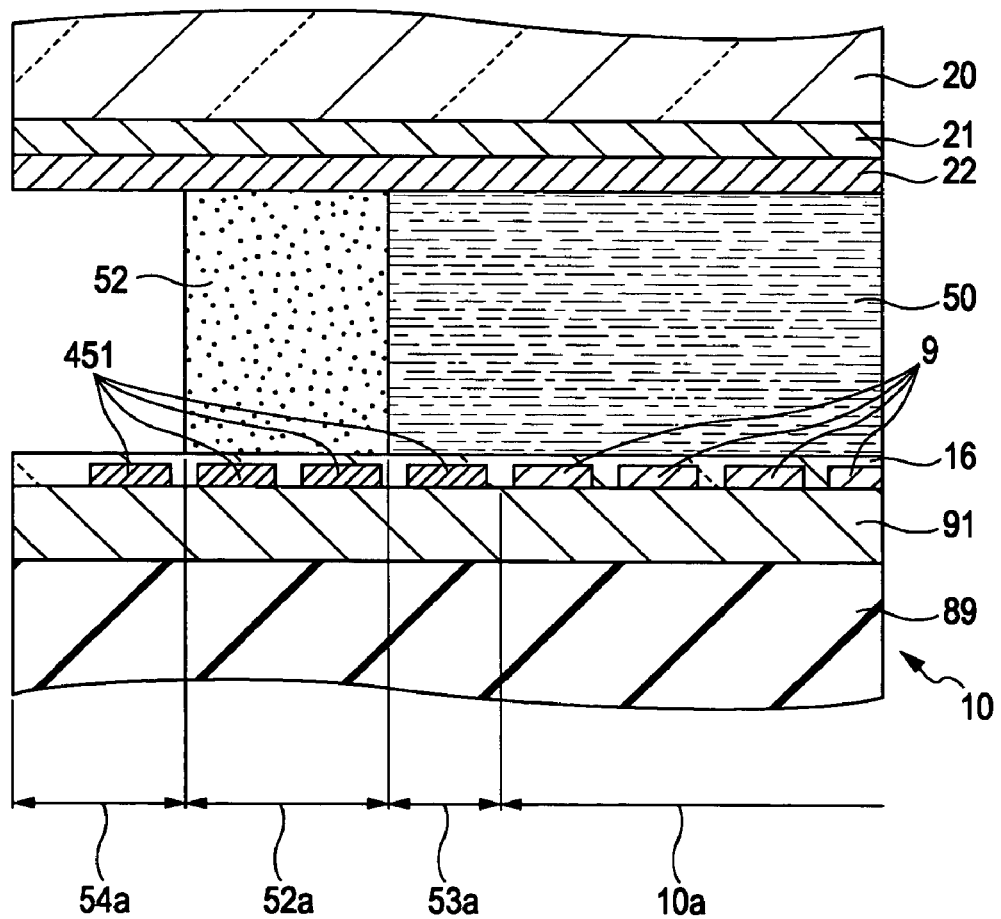
FIG. 25 is a sectional view taken along line A-A' of FIG. 20.

Next, a seal low-side layer according to the fourth embodiment will be described with reference to FIGS. 25 and 26. FIG. 25 is a sectional view taken along line A-A' of FIG. 20, and FIG. 26 is a schematic view showing a plane pattern of a seal low-side layer on a TFT substrate.

Figure 26:
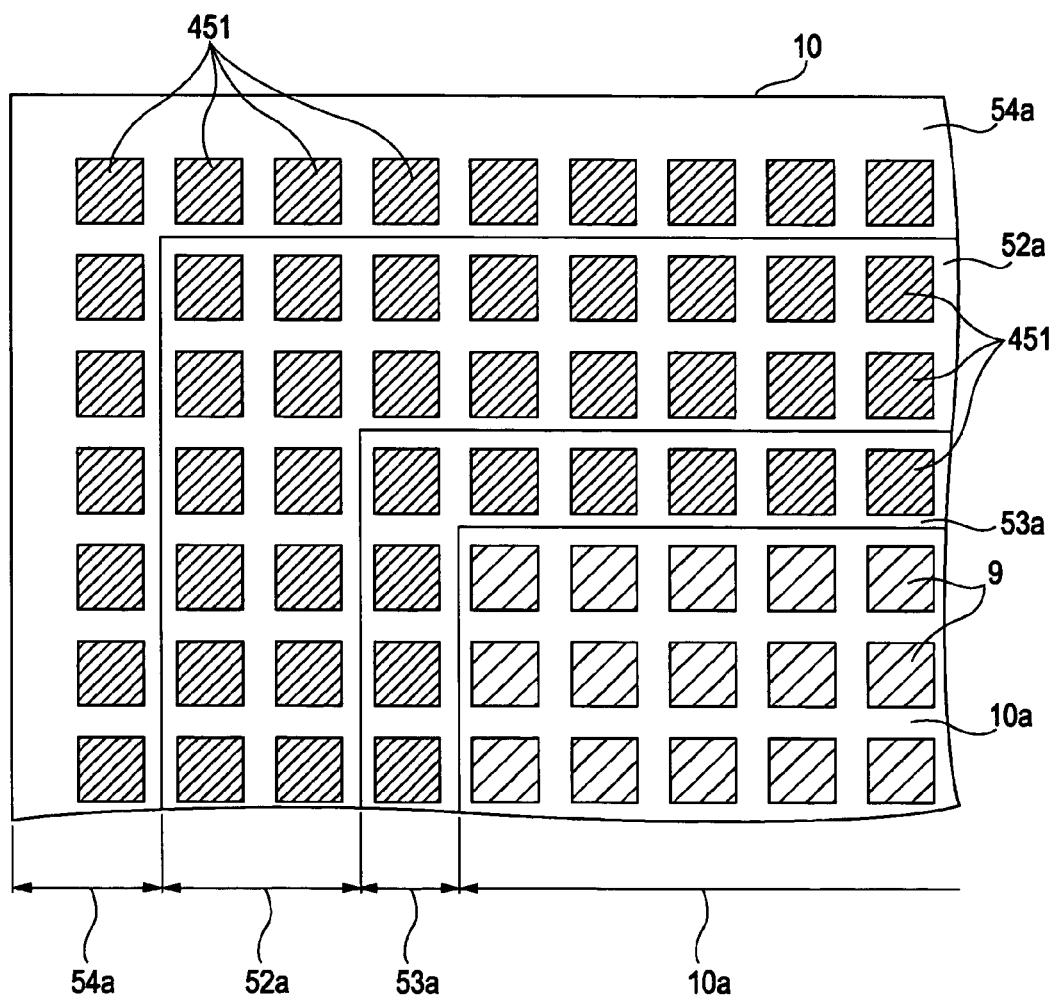
FIG. 26 is a schematic view showing a plane pattern of a seal low-side layer on a TFT substrate.

As shown in FIGS. 25 and 26, in this embodiment, particularly, a seal low-side layer 451 is formed in a seal region 52*a*, a light shield region 53*a* and a seal outside region 54*a* on the TFT substrate 10. The seal low-side layer 451 is formed of the same film as the pixel electrode 9, that is, the same kind of ITO film located at the same layer as the pixel electrode 9. That is, the optical thin film 91, the seal low-side layer 45*a* and the alignment layer 16 are stacked in order in each of the seal region 52*a*, the light shield region 53*a* and the seal outside region 54*a*. Accordingly, an area of an interface between the alignment layer 16 and the optical thin film 91 is reduced in at least the seal region 52*a* on the TFT substrate 10, compared to a case where the seal low-side layer 451 is not formed. In other words, an interface between the alignment layer 16 and the seal low-side layer 451 and an interface between the seal low-side layer 451 and the optical thin film 91 are formed in the seal region 52*a* on the TFT substrate 10, instead of an interface between the alignment layer 16 and the optical thin film 91. Accordingly, humidity can be prevented from penetrating from the outside into the image display region 10*a* via the interface between the alignment layer 16 and the optical thin film 91 due to low adhesion at the interface between the alignment layer 16, which is formed of, for example, an transparent organic film such as a polyimide film, and the optical thin film 91 which is formed of, for example, a silicon nitride film, a silicon oxynitride film or the like. In other words, high interface adhesion can be obtained by forming the interface between the alignment layer 16 and the seal low-side layer 451 and the interface between the seal low-side layer 451 and the optical thin film 91, which have adhesion higher than that of the interface between the alignment layer 16 and the optical thin film 91, in at least a portion of the seal region 52*a*. Accordingly, humidity resistance of the liquid crystal display device can be improved, which results in improvement of reliability of the device.

In addition, since the seal low-side layer 451 is formed of the same film as the pixel electrode 9, as described above, the humidity resistance of the device can be improved without causing complexity of a stacked structure on the TFT substrate 10 or complexity of a manufacturing process.

In addition, as the seal low-side layer 451 is formed in the seal region 52*a*, the light shield region 53*a* and the seal outside region 54*a*, rubbing remnants such as abrasion dusts of rubbing cross, which may occur during rubbing, due to steps of a surface of the optical thin film 91 and a surface of the pixel electrode 9 (in other words, steps of a surface of the TFT substrate 10 and a surface of the pixel electrode 9) becomes apt to remain in the seal region 52*a*, the light shield region 53*a* and the seal outside region 54*a*. In other words, rubbing remnants can be prevented from remaining in the image display region 10*a* and hence having an effect on image quality.

In addition, as shown in FIG. 26, in this embodiment, the seal low-side layer 451 is particularly formed in the same plane pattern as the pixel electrode 9 when viewed in plan from the top of the TFT substrate 10. That is, when the pixel electrode 9 is patterned in the form of a matrix from the ITO film in the image display region 10*a*, the seal low-side layer 451 is also formed in the same plane pattern (that is, the plane pattern in the form of a matrix) from the ITO film in the seal region 52*a*, the light shield region 53*a* and the seal outside region 54*a*. In other words, a pattern of pixel electrodes, which form dummy pixels formed in the light shield region 53*a* of a frame shape between the seal region 52*a* and the image display region 10*a*, is formed up to the seal region 52*a* and the seal outside region 54*a*. Accordingly, it is easy to form the seal low-side layer 451 in the same process as the pixel electrode 9. That is, it is possible to form the seal low-side layer 451 in the same process without alternating most of the process for forming the pixel electrode 9.

In addition, for the following reason, it is preferable that the seal low-side layer 451 is in an electrically floating state (that is, a state where the seal low-side layer 451 is not electrically connected to a power source, wiring lines or the like, for example). That is, in this state, an adverse effect on image quality, which may occur due to an electrical coupling between a potential of the seal low-side layer 451 and a potential of the pixel electrode 9 can be reduced or prevented. In this case, for example, in order to stabilize the potential of the seal low-side layer 451, the seal low-side layer 451 may be connected to a wiring line at a predetermined potential, or the seal low-side layer 451 may be used as a portion of the wiring line at the predetermined potential.

Figure 27:
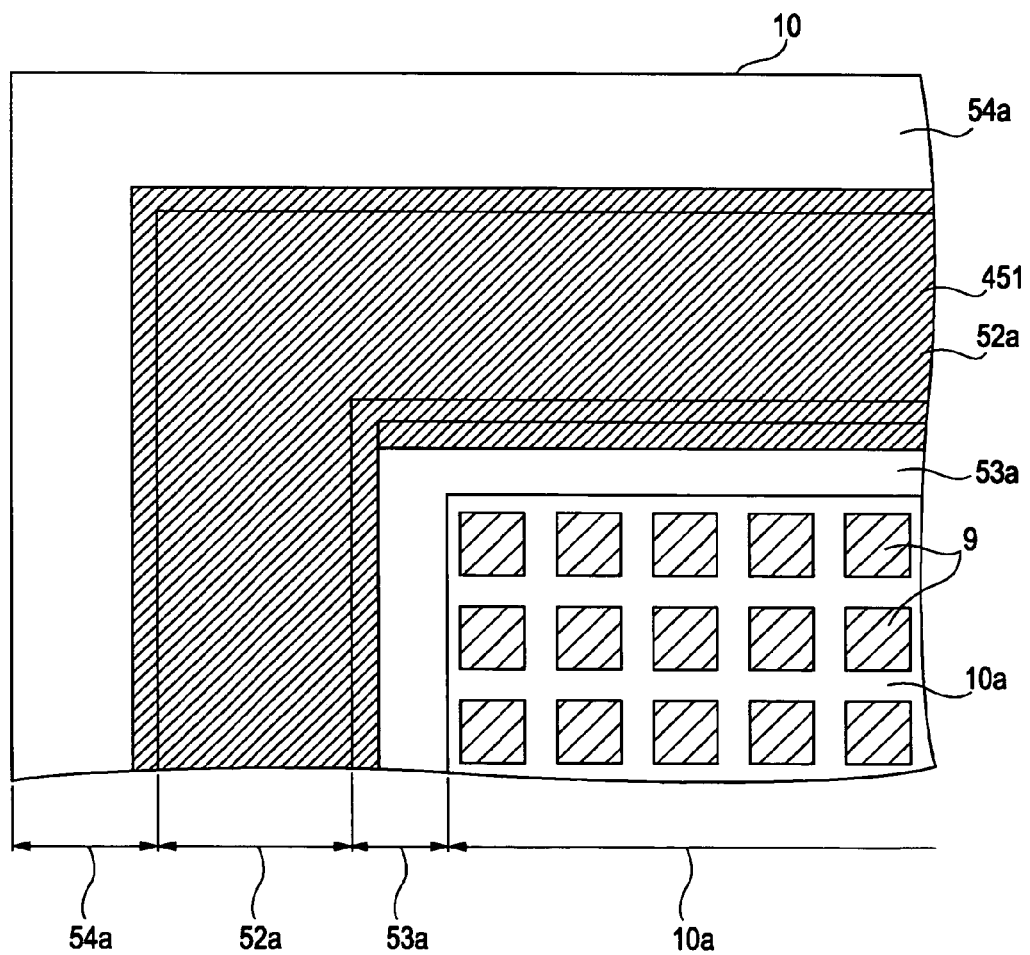
FIG. 27 is a schematic view showing a plane pattern of a seal low-side layer on a TFT substrate according to a first modification of the fourth embodiment of the invention.

Next, a seal low-side layer according to a first modification of the fourth embodiment will be described with reference to FIG. 27. FIG. 27 is a schematic view showing a plane pattern of a seal low-side layer on a TFT substrate according to a first modification of the fourth embodiment of the invention.

As shown in FIG. 27, in the first modification, the seal low-side layer 451 is particularly formed in a region including the seal region 52a when viewed in plan from the top of the TFT substrate 10. That is, the interface between the alignment layer 16 and the optical thin film 91 is not formed in the seal region 52a on the TFT substrate 10. Accordingly, humidity can be more reliably prevented from penetrating from the outside into the image display region 10a via the interface between the alignment layer 16 and the optical thin film 91 due to low adhesion at the interface between the alignment layer 16 and the optical thin film 91.

Figure 28:
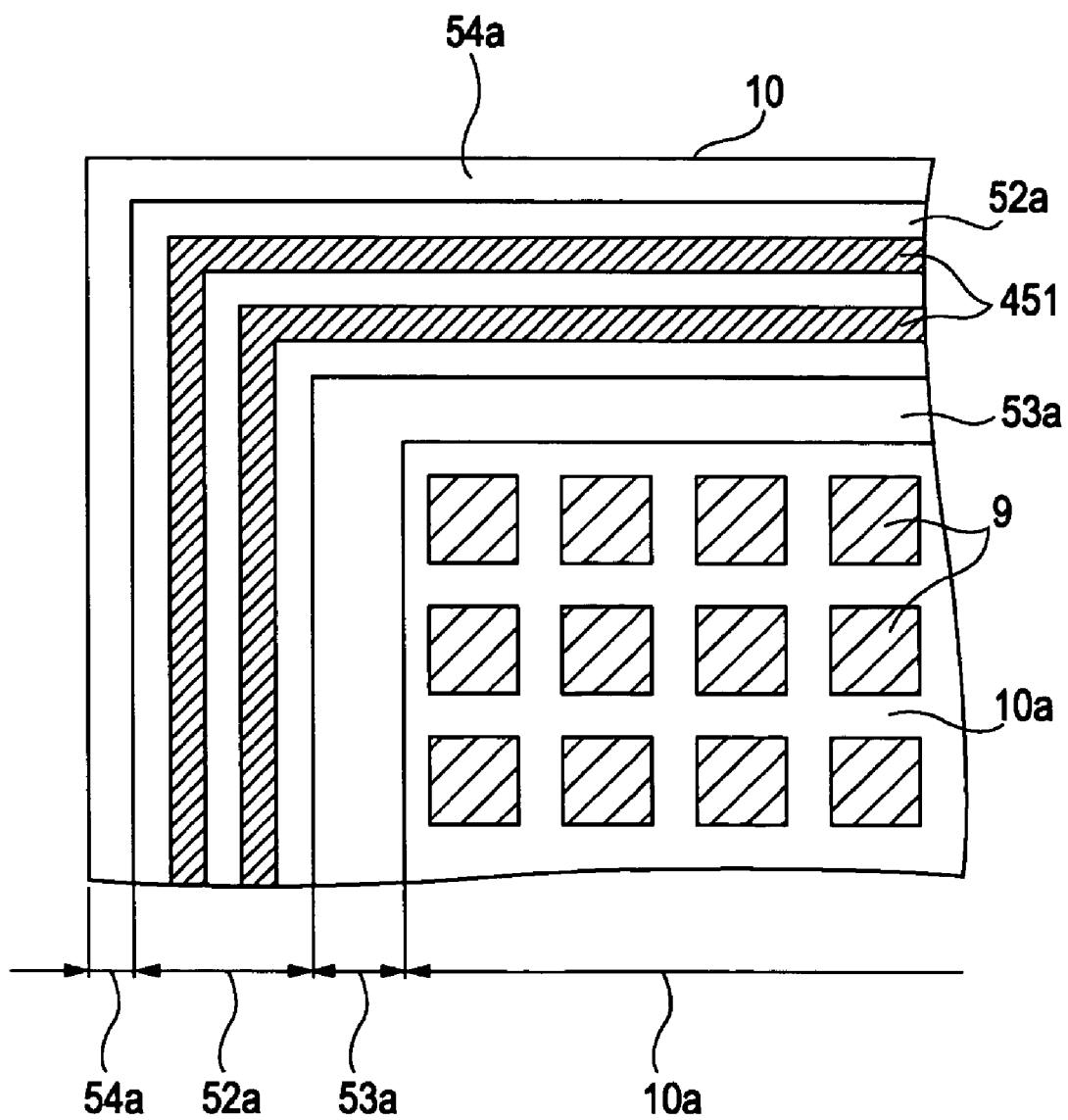
FIG. 28 is a schematic view showing a plane pattern of a seal low-side layer on a TFT substrate according to a second modification of the fourth embodiment of the invention.
Figure 29:
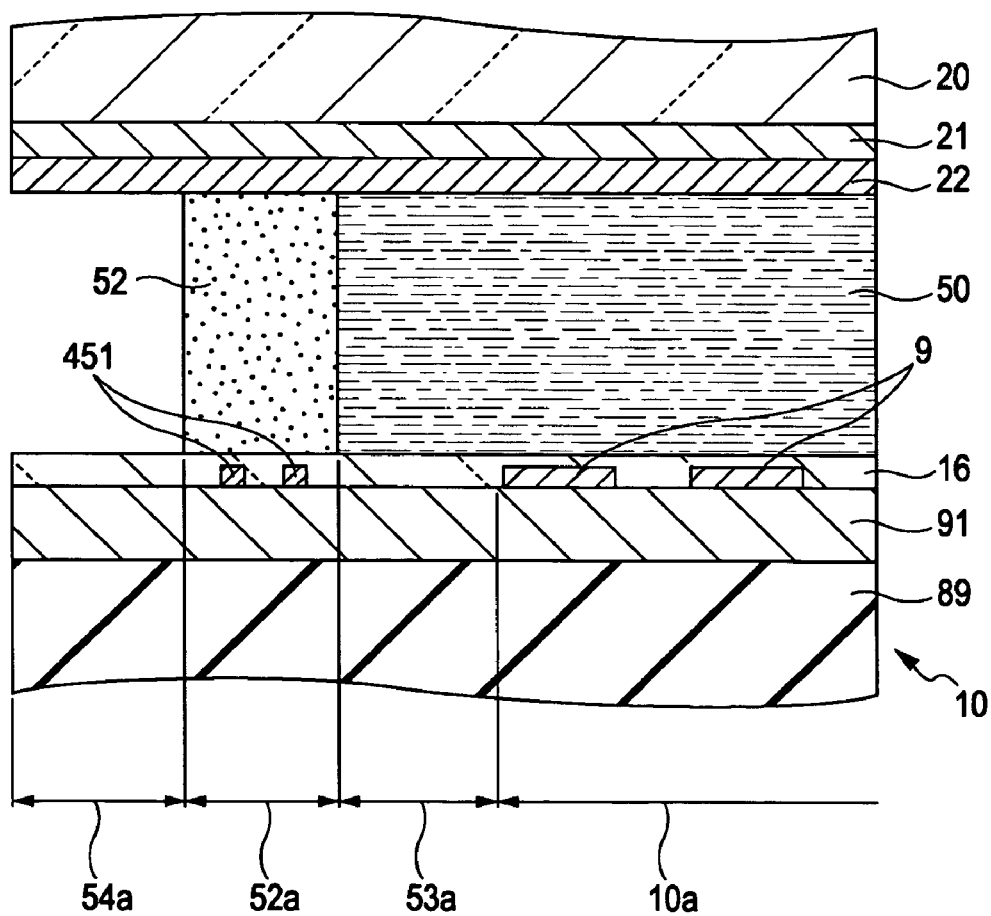
FIG. 29 is a sectional view taken along line A-A' of FIG. 20 in the second modification of the fourth embodiment of the invention.

Next, a seal low-side layer according to a second modification of the fourth embodiment will be described with reference to FIGS. 28 and 29. FIG. 28 is a schematic view showing a plane pattern of a seal low-side layer on a TFT substrate according to a second modification of the fourth embodiment of the invention, and FIG. 29 is a sectional view taken along line A-A' of FIG. 20 in the second modification of the fourth embodiment of the invention.

As shown in FIG. 28, in the second modification, the seal low-side layer 451 is particularly formed in the seal region 52a to surround the image display region 10a when viewed in plan from the top of the TFT substrate 10. More specifically, the seal low-side layer 451 includes two portions, that is, a portion close to the image display region 10a and a portion far from the image display region 10a, each of which is continuously formed to surround the image display region 10a. That is, when viewed in plan from the top of the TFT substrate 10, the seal low-side layer 451 is formed such that the image display region 10a is doubly surrounded by the two portions. Since the seal low-side layer 451 is formed of the ITO film, as described above, it blocks most of humidity. Accordingly, humidity can be prevented from penetrating from the outside into the image display region 10a. That is, in addition to FIG. 28, as shown in FIG. 29, as the seal low-side layer 451 functions as a barrier that isolates the image display region 10a from the outside, a path of penetration of humidity can be mostly or completely blocked. Accordingly, humidity resistance of the device can be further improved. In addition, as the interface between the alignment layer 16 and the seal low-side layer 451 and the interface between the seal low-side layer 451 and the optical thin film 91 are formed in a region in which the seal low-side layer 451 is formed, high interface adhesion can be obtained.

Figure 30:
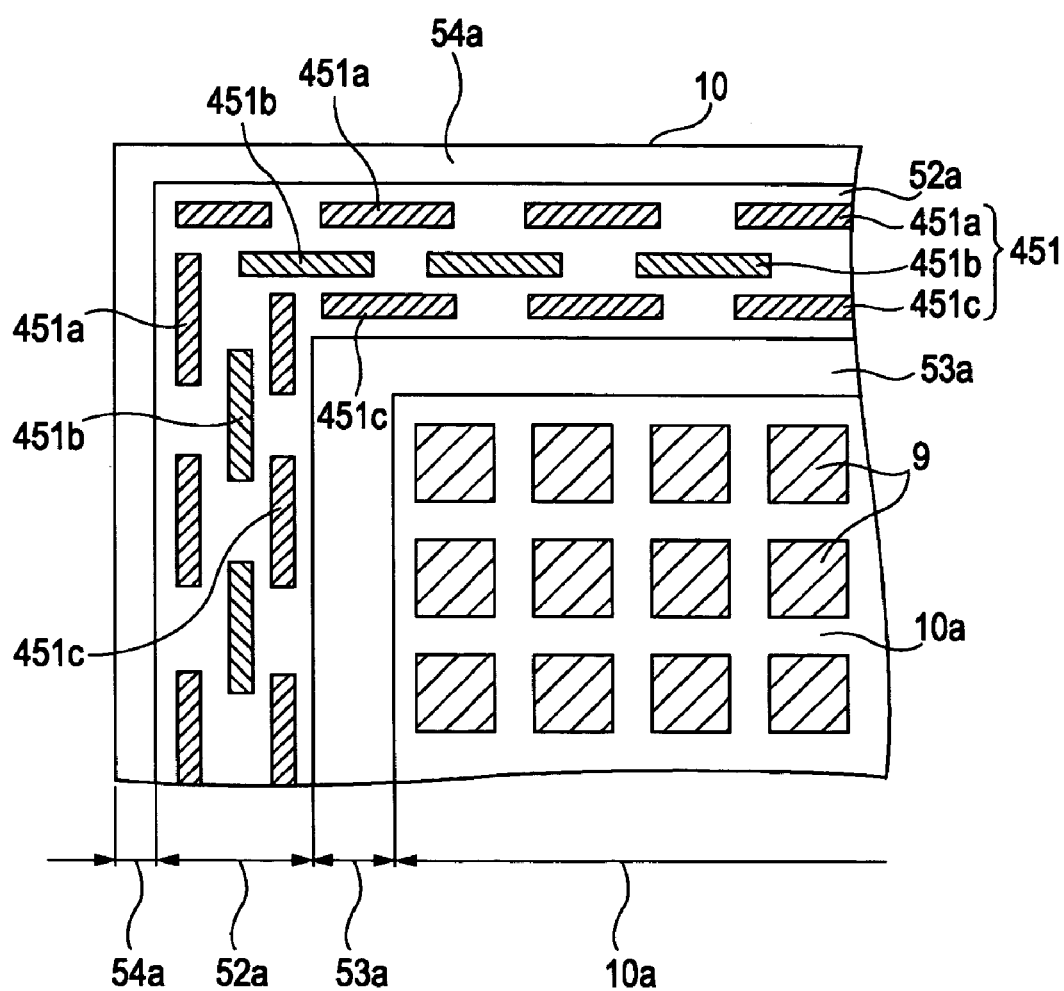
FIG. 30 is a schematic view showing a plane pattern of a seal low-side layer on a TFT substrate according to a third modification of the fourth embodiment of the invention.

Next, a seal low-side layer according to a third modification of the fourth embodiment will be described with reference to FIG. 30. FIG. 30 is a schematic view showing a plane pattern of a seal low-side layer on a TFT substrate according to a third modification of the fourth embodiment of the invention.

As shown in FIG. 30, in the third modification, particularly, the seal low-side layer 451 has a plurality of portions 451a, 451b and 451c, which are separated from each other and surround the image display region 10a when viewed in plan from the top of the TFT substrate 10, in the seal region 52a 10a. Each of the plurality of portions 451a, 451b and 451c is separately arranged in a row to surround the image display region 10a. These rows cross each other in their arrangement direction (that is, a direction crossing a direction from the seal region 52a to the image display region). In other words, the plurality of portions 451a, 451b and 451c are arranged in such a manner that one portion blocks arranged gaps of another portion. Accordingly, in the same way as the second modification shown in FIG. 29, as the seal low-side layer 451 comprising the plurality of portions 451a, 451b and 451c functions as a barrier that isolates the image display region 10a from the outside, a path of penetration of humidity can be blocked as the path becomes complex or extended. Accordingly, humidity resistance of the device can be further improved. In addition, as the interface between the alignment layer 16 and the seal low-side layer 451 and the interface between the seal low-side layer 451 and the optical thin film 91 are formed in a region in which the seal low-side layer 451 is formed, high interface adhesion can be obtained.

As described above, in the liquid crystal display device according to this embodiment, humidity resistance can be maintained by the seal low-side layer 451 which is provided in at least the seal region 52a and is formed of the same film as the pixel electrode 9, while the transmittance can be improved by the optical thin film 91 provided immediately below the pixel electrode 9, thereby obtaining high image quality. In addition, reliability of the device can be improved without causing complexity of a stacked structure on the TFT substrate 10 or complexity of a manufacturing process.

Next, a method of manufacturing the liquid crystal display device according to the first embodiment will be described with reference to FIG. 31. FIG. 31 is a flow chart illustrating steps of a manufacturing process of the liquid crystal display device according to the fourth embodiment of the invention.

First, as shown in FIG. 31, wiring lines such as the TFTs 30 for pixel switching, the scan lines 3a, the data lines and the like are formed from various conductive layers, semiconductor layers, insulating layers and the like to the interlayer insulating layer 89 (Step S11). At this time, the interlayer insulating layer 89 is formed by stacking NSG by, for example, a chemical vapor deposition (CVD) method. In addition, the interlayer insulating layer 89 may be formed by stacking silicate glass such as PSG, BSG, BPSG or the like, silicon nitride, silicon oxide or the like. The refractive index of the interlayer insulating layer 89 as constructed above is about 1.4.

Next, an optical thin film forming process is performed to form the optical thin film 91 on the interlayer insulating layer 89 by stacking a silicon oxynitride film (SiON) using silicon nitride (SiN) by, for example, a CVD method while supplying oxygen (O2) gas (Step S12). At this time, the optical thin film 91 is formed on the entire surface of the TFT substrate 10, and environmental conditions such as the amount of supplied oxygen, pressure, temperature and the like are so controlled that the optical thin film 91 has a middle refractive index (for example, a refractive index of 1.6 to 1.8) between the refractive index of the interlayer insulating layer 89 and the refractive index of the pixel electrode 9. In addition, it is preferable to form the optical thin film 91 to have the thickness of 55 to 100 nm.

Next, a pixel electrode forming process is performed to form the pixel electrode 9 by stacking an ITO film in a plane matrix pattern in the image display region 10a on the optical thin film 91 (Step S13). At this time, in this embodiment, the seal low-side layer 451 is formed by stacking the ITO film in the same plane matrix pattern within the seal region 52a, the light shield region 53a and the seal outside region 54a. Accordingly, humidity resistance of the device is maintained by the seal low-side layer 451 while the transmittance is improved by the optical thin film 91. In addition, in the pixel electrode forming process, the seal low-side layer 451 may be formed in some or all of the seal region 52a, and may be further formed in the light shield region 53a, the seal outside region 54a, etc.

Next, the alignment layer 16 is formed by applying polyimide on a surface of the TFT substrate 10 (Step S14). At this time, the formed alignment layer 16 is rubbed.

As shown in FIG. 31, the ITO film is stacked on the opposite substrate 20 by a sputtering method or the like at the same time with, or before or after the Steps S11 to S14 related to manufacture of the TFT substrate 10 (Step S21).

Next, the alignment layer 22 is formed by applying polyimide on a surface of the opposite substrate 20 (Step S22). At this time, the formed alignment layer 22 is rubbed.

Thereafter, a bonding process is performed to bond the alignment layer 16 formed on the TFT substrate 10 and the alignment layer 22 formed on the opposite substrate 20 together with the sealing material 52 interposed therebetween (Step S31). Here, since an area of the interface between the alignment layer 16 having low interface adhesion and the optical thin film 91 is particularly reduced in the seal region 52a, compared to a case where the seal low-side layer 451 is not formed, humidity resistance of the device is increased.

Subsequently, the liquid crystals 50 are injected between the TFT substrate 10 and the opposite substrate 20, which are bonded together (Step S32).

According to the above-described manufacturing method of the liquid crystal display device, the liquid crystal display device related to the fourth embodiment can be manufactured. Here, in the pixel electrode forming process, particularly, humidity resistance can be maintained by the seal low-side layer 451 which is provided in the seal region 52a and is formed of the same film as the pixel electrode 9, while the transmittance can be improved by the optical thin film 91 provided immediately below the pixel electrode 9. Accordingly, an electro-optical device with high image quality can be manufactured. In addition, since the seal low-side layer 451 is formed in the pixel electrode forming process, complexity of the manufacturing process of the device is not caused, and also, reduction of yield of device is not caused.

It should be understood that the liquid crystal display device of the invention can be modified in various ways without departing from the scope of the invention and without being limited to those illustrated and shown in the figures. For example, although the above-described liquid crystal display device has been illustrated with a liquid crystal display module of an active matrix type using active elements such as TFTs, it may be a liquid crystal display module of an active matrix type using other active elements such as thin film diodes (TFDs).

In addition, although the electro-optical device has been illustrated with the liquid crystal display device in this embodiment, the invention may be applied to other various kinds of electro-optical devices including an electroluminescence device such as an organic electroluminescence device or an inorganic electroluminescence device, a plasma display device, a field emission display (FED) device, a surface-conduction electron-emitter display (SED) device, a light emitting diode (LED) display device, an electrophoresis display device, or a device using a small-sized TV that employs a thin cathode ray tube or a liquid crystal shutter.

In addition, the electro-optical device may be a display device having a semiconductor substrate on which elements are formed, for example, an LCOS (Liquid Crystal On Silicon) device. In the LCOS device, a single crystalline silicon substrate is used as an element substrate, and transistors as switching elements used for pixels or peripheral circuits are formed on the single crystalline substrate. In addition, in the pixels, elements of pixels are formed below reflection type pixel electrodes.

In addition, the electro-optical device may be a display device in which a pair of electrodes is formed on the same layer of one substrate, for example, an IPS (In-Plane Switching) device, or a display device in which a pair of electrodes is formed on one substrate with an insulating layer interposed therebetween, for example, a FFS (Fringe Field Switching) device.

Electronic Apparatus

Next, a case where a liquid crystal display device as the above-described electro-optical device is applied to an electronic apparatus will be described. In the following description, the electronic apparatus is illustrated with a projection type display apparatus, particularly, a projector. FIG. 32 is a view showing a configuration of a projector having three liquid crystal display devices according to the above embodiments.

As shown in FIG. 32, a projector 1100 includes liquid crystal display devices according to the above embodiments as three light valves for RGB 100R, 100G and 100B, for example.

In the projector 1100, when projection light is emitted from a lamp unit 1102 as a white light source such as a metal halide lamp, the projection light is divided into light components R, G and B corresponding to three RGB primary colors by four mirrors 1106 and two dichroic mirrors 1108. These light components R, G and B are guided to the light valves 100R, 100G and 100B corresponding to the three primary colors, respectively.

At this time, particularly, the light component B is guided to the light valve 100B via a relay lens system 1121 including a light-input lens 1122, a relay lens 1123 and a light-output lens 1124 in order to prevent loss of light due to a long optical path.

In addition, the light components corresponding to the three primary colors, which are modulated by the light valves 100R, 100G and 100B, are mixed by a dichroic prism 1112, and then is projected as a color image into a screen 1120 via a projection lens 1114.

Further, in addition to the electronic apparatus described with reference to FIG. 32, it is to be understood that the electronic apparatus to which the electro-optical device of the invention may be applied may include a mobile personal computer, a mobile telephone, a liquid crystal television, a view finder type or monitor direct-view type video tape recorder, a car navigator, a pager, an electronic pocket notebook, a calculator, a word processor, a workstation, a video conference telephone, a POS terminal, an apparatus equipped with a touch panel, etc.

The present invention is not limited to the above-described exemplary embodiments, but may be properly changed in various ways without departing from the scope and spirit of the invention when read throughout the annexed claims and the specification. It should be understood by those skilled in the art that various modifications, combinations, sub-combinations and alterations may be occur depending on design requirements and other factors insofar as they are within the scope of the appended claims or the equivalents thereof.

The present invention contains subject matter related to Japanese Patent Application JP 2005-377155 filed on Dec. 28, 2005 and to Japanese Patent Application JP 2006-033343 filed on Feb. 10, 2006, in the Japanese Patent Office, the entire contents of which are incorporated herein by reference.

What is claimed is:

1. An electro-optical device comprising:
a first substrate;
a second substrate facing the first substrate;

a sealing material interposed between the first and second substrates;

liquid crystals interposed between the first and second substrates in at least an effective pixel region;

an alignment layer formed on at least one of the first and second substrates immediately below the sealing material, the alignment layer aligning the liquid crystals;

a lower layer formed below the alignment layer; and a transparent conductive layer formed between the alignment layer and the lower layer and intimately adhered to the alignment layer and the lower layer, the transparent conductive layer being located in a region overlapping at least the sealing material in plan view, wherein a groove having a closed loop shape is formed in the region overlapping at least the sealing material, the groove being located at a surface of the lower layer that contacts the transparent conductive layer.

2. The electro-optical device according to claim 1, wherein an external connection terminal is formed on at least one of the first and second substrates, and an electrode is formed in the effective pixel region, and the transparent conductive layer is formed on the entire surface of a region except the external connection terminal and the electrode between the alignment layer and the lower layer.

3. The electro-optical device according to claim 1, wherein the groove is circumferentially formed to surround the effective pixel region.

4. The electro-optical device according to claim 1, wherein the groove is plural in number.

5. The electro-optical device according to claim 1, wherein a surface of at least one of the first and second substrates, which contacts the sealing material, has an uneven section formed by the groove.

6. The electro-optical device according to claim 5, wherein the groove has an opening edge formed by the surface of at least one of the first and second substrates, the groove having a right-angled section that contacts with the sealing material.

7. The electro-optical device according to claim 5, wherein the groove has an opening edge formed by the surface of at least one of the first and second substrates, the groove having a obtuse-angled section that contacts with the sealing material.

8. The electro-optical device according to claim 1, wherein the lower layer is formed of an insulating film.

9. An electro-optical device comprising:
a first substrate;
a second substrate facing the first substrate;
a sealing material interposed between the first and second substrates;
liquid crystals interposed between the first and second substrates in at least an effective pixel region;
an alignment layer formed on at least one of the first and second substrates immediately below the sealing material, the alignment layer aligning the liquid crystals;
a lower layer formed immediately below the alignment layer; and
a groove located in a region overlapping at least the sealing material, the groove being formed at a surface of the lower layer that contacts a transparent conductive layer, the groove having a closed loop shape.

10. An electro-optical device comprising:
a pair of first and second substrates with an electro-optical material interposed between the first and second substrates;
a pixel electrode formed of a transparent conductive layer formed on the first substrate, the pixel electrode being formed in a display region;
an alignment layer formed on the pixel electrode, the alignment layer controlling an alignment state of the electro-optical material;
a sealing material that bonds the first and second substrates together, the sealing material being located in a seal region that surrounds the display region;
an optical thin film stacked on the pixel electrode at a position between the first substrate and the pixel electrode, the optical thin film having a middle refractive index between a refractive index of the first substrate and a refractive index of the pixel electrode; and
a seal low-side layer that is formed below the seal material in at least a portion of the seal region, the seal low-side layer being formed of the same film as the pixel electrode, the seal low-side layer including a first portion that is formed in the seal region and has a continuously formed loop shape that surrounds the display region when viewed in plan from the top of the first substrate.

11. The electro-optical device according to claim 10, wherein the seal low-side layer has the same plane pattern as the pixel electrode when viewed in plan from the top of the first substrate.

12. The electro-optical device according to claim 10, wherein the seal low-side layer has a plurality of second portions that are separately formed in the seal region and surround the display region when viewed in plan from the top of the first substrate.

13. The electro-optical device according to claim 10, wherein the optical thin film has a refractive index of 1.6 to 1.8.

14. The electro-optical device according to claim 10, wherein an optical absorption coefficient of the optical thin film is smaller than an optical absorption coefficient of the transparent conductive layer.

15. The electro-optical device according to claim 10, wherein the optical thin film includes at least one of an inorganic nitride film and an inorganic oxynitride film.

16. An electronic apparatus having the electro-optical device according to 10.

* * * * *